US009552658B2

(12) United States Patent
Shi et al.

(10) Patent No.: US 9,552,658 B2
(45) Date of Patent: Jan. 24, 2017

(54) METHODS AND SYSTEMS FOR VIDEO COMPRESSIVE SENSING FOR DYNAMIC IMAGING

(71) Applicants: Jianing V. Shi, Houston, TX (US); Aswin C. Sankaranarayanan, Houston, TX (US); Christoph Emanuel Studer, Houston, TX (US); Richard G. Baraniuk, Houston, TX (US)

(72) Inventors: Jianing V. Shi, Houston, TX (US); Aswin C. Sankaranarayanan, Houston, TX (US); Christoph Emanuel Studer, Houston, TX (US); Richard G. Baraniuk, Houston, TX (US)

(73) Assignee: William Marsh Rice University, Houston, TX (US)

( * ) Notice: Subject to any disclaimer, the term of this patent is extended or adjusted under 35 U.S.C. 154(b) by 503 days.

(21) Appl. No.: 13/952,353

(22) Filed: Jul. 26, 2013

(65) Prior Publication Data

US 2014/0029824 A1    Jan. 30, 2014

Related U.S. Application Data

(60) Provisional application No. 61/676,212, filed on Jul. 26, 2012.

(51) Int. Cl.
   *G06T 5/50*   (2006.01)
   *G06T 11/00*  (2006.01)

(52) U.S. Cl.
   CPC ............... *G06T 11/005* (2013.01); *G06T 5/50* (2013.01); *G06T 2207/10016* (2013.01)

(58) Field of Classification Search
   CPC . G06T 5/50; G06T 11/005; G06T 2207/10016
   See application file for complete search history.

(56) References Cited

U.S. PATENT DOCUMENTS

| 7,602,183 B2 | 10/2009 | Lustig et al. |
| 7,646,924 B2 | 1/2010 | Donoho |
| 7,864,999 B2 | 1/2011 | Chang et al. |
| 7,903,858 B2 | 3/2011 | Chang et al. |

(Continued)

OTHER PUBLICATIONS

Muise et al., "Computational sensing algorithms for image reconstruction and the detection of moving objects in multiplexed imaging systems", 2008, Proc. SPIE 6977, Optical Pattern Recognition XIX, 69770M.*

(Continued)

*Primary Examiner* — Katrina Fujita
(74) *Attorney, Agent, or Firm* — Osha Liang LLP

(57) ABSTRACT

A compressive sensing system for dynamic video acquisition. The system includes a video signal interface including a compressive imager configured to acquire compressive sensed video frame data from an object, a video processing unit including a processor and memory. The video processing unit is configured to receive the compressive sensed video frame data from the video signal interface. The memory comprises computer readable instructions that when executed by the processor cause the processor to generate a motion estimate from the compressive sensed video frame data and generate dynamical video frame data from the motion estimate and the compressive sensed video frame data. The dynamical video frame data may be output.

11 Claims, 14 Drawing Sheets

(56) References Cited

U.S. PATENT DOCUMENTS

| | | | |
|---|---|---|---|
| 2006/0083440 A1* | 4/2006 | Chen | H04N 5/23238 382/284 |
| 2012/0008844 A1* | 1/2012 | Bilgin | H04N 19/61 382/131 |
| 2012/0038805 A1 | 2/2012 | Kelly et al. | |
| 2013/0121614 A1* | 5/2013 | Intwala | G06T 5/009 382/280 |

OTHER PUBLICATIONS

Castillo et al., "Compressible Image Registration for Thoracic Computed Tomography Images", 2009, Journal of Medical and Biological Engineering.*

Gamper, Urs et al. "Compressed Sensing in Dynamic MRI." Magnetic Resonance in Medicine 59.2 (2008): 365-73.

Jung, Hong et al. "K-t FOCUSS: A General Compressed Sensing Framework for High Resolution Dynamic MRI." Magnetic Resonance in Medicine 61.1 (2009): 103-16.

Sankaranarayanan, Aswin C. et al., "CS-MURI: Video Compressive Sensing for Spatial-Multiplexing Cameras" ICIP (2012) 10 pgs.

Horn, Berthold K.P., and Brian G. Schunck. "Determining Optical Flow." Artificial Intelligence 17.1-3 (1981): 185-203.

Haker, Steven et al. "Optimal Mass Transport for Registration and Warping." International Journal of Computer Vision 60.3 (2004): 225-40.

Gigengack, F., L. et al., "Motion Correction in Dual Gated Cardiac PET Using Mass-Preserving Image Registration." IEEE Transactions on Medical Imaging 31.3 (2011): 698-712.

Goldstein, Tom, and Stanley Osher. "The Split Bregman Method for L1-Regularized Problems." SIAM Journal on Imaging Sciences 2.2 (2009): 323-43.

Wang, Yilun, et al., "A New Alternating Minimization Algorithm for Total Variation Image Reconstruction." SIAM Journal on Imaging Sciences 1.3 (2008): 1-23.

Doretto, Gianfranco et al. "Dynamic Textures" International Journal of Computer Vision 51.2 (2003): 91-109.

Chan, A.b., and N. Vasconcelos. "Modeling, Clustering, and Segmenting Video with Mixtures of Dynamic Textures." IEEE Transactions on Pattern Analysis and Machine Intelligence 30.5 (2008): 909-26.

Veeraraghavan, Ashok et al. "Matching Shape Sequences in Video with Applications in Human Movement Analysis." IEEE Transactions on Pattern Analysis and Machine Intelligence 27.12 (2005): 1896-909.

Sankaranarayanan, Aswin C. et al., "Compressive Acquisition of Dynamic Scenes" European Conference on Computer Vision, 6311 (2010) 129-142.

Candes, E.J. et al. "Robust Uncertainty Principles: Exact Signal Reconstruction from Highly Incomplete Frequency Information." IEEE Transactions on Information Theory 52.2 (2006): 489-509.

Van Den Berg, Ewout, and Michael P. Friedlander. "Probing the Pareto Frontier for Basis Pursuit Solutions." SIAM Journal on Scientific Computing 31.2 (2009): 890-912.

Liu, Jun et al. "SLEP: Sparse Learning with Efficient Projections" Arizona State University Oct. 8, 2010 pp. 1-55.

Wright, Stephen J.et al. "Sparse Reconstruction by Separable Approximation." IEEE Transactions on Signal Processing 57.7 (2009): 2479-493.

Douglas, Jim, and H. H. Rachford. "On the Numerical Solution of Heat Conduction Problems in Two and Three Space Variables." Transactions of the American Mathematical Society 82.2 (1956): 421-439.

Peaceman, D. W., and H. H. Rachford, Jr. "The Numerical Solution of Parabolic and Elliptic Differential Equations." Journal of the Society for Industrial and Applied Mathematics 3.1 (1955): 28-41.

Gabay, Daniel, and Mercier, Bertrand.,"A Dual Algorithm for the Solution of Nonlinear Variational Problems Via Finite Element Approximation" Comp. & Maths with Appls. vol. 2 (1976) 17-40.

Afonso, Manya et al. "Fast Image Recovery Using Variable Splitting and Constrained Optimization." IEEE Transactions on Image Processing (2010): 1-11.

Yang, Junfeng, and Yin Zhang. "Alternating Direction Algorithms for I1-Problems in Compressive Sensing." SIAM Journal on Scientific Computing 33.1 (2011): 250-78.

A. Bissacco, et al. "Recogllitioii of human gaits". in IEEE Conference on Computer Vision and Pattern Recognition, 2 (2001) 52-57.

G. Aggarwal et al. "A system identification appoarch for video-based face recognition". ICPR (2004) 175-178.

Lee, C. S. et al., "Human motion synthesis by motion manifold learning and motion primitive segmentation". International Conference on Articulated Motion and Deformable Objects, (2006) 463-473.

Qin, Z. et al., "Efficient block coordinate descent algorithms for the group Lasso." Columbia University, Tech Report, (2010) 23 pgs.

Goldfarb, Donald et al., "Fast alternating linearization methods for minimizing the sum of two convex functions." Columbia University Tech Report (2010) 28 pgs.

Deng, Wei et al., "Group sparse optimization by alternating direction method." Rice University Tech Report (2011) 18 pgs.

Duarte, Marco F., and Yonina C. Eldar. "Structured Compressed Sensing: From Theory to Applications." IEEE Transactions on Signal Processing 59.9 (2011): 4053-085.

Romberg, J. "Imaging via Compressive Sampling." IEEE Signal Processing Magazine 25.2 (2008): 14-20.

Candes, E.J., and M.B. Wakin. "An Introduction to Compressive Sampling." IEEE Signal Processing Magazine 25.2 (2008): 21-30.

Willett, Rebecca M., et al. "Compressed Sensing for Practical Optical Imaging Systems: A Tutorial." SPIEDigitalLibrary 50.7 (2011) 13 pgs.

* cited by examiner

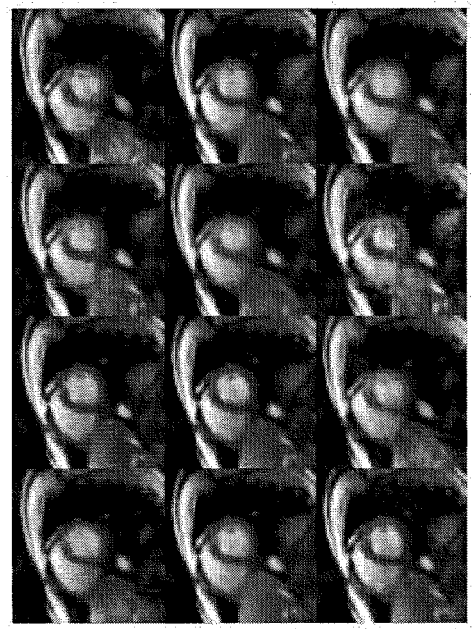
FIG. 13

METHODS AND SYSTEMS FOR VIDEO COMPRESSIVE SENSING FOR DYNAMIC IMAGING

CROSS-REFERENCE TO RELATED APPLICATIONS

This application claims priority under 35 U.S.C. §119(e) to U.S. Provisional Patent Application Ser. No. 61/676,212, filed on Jul. 26, 2012, which is herein incorporated by reference in its entirety.

STATEMENT REGARDING FEDERALLY SPONSORED RESEARCH OR DEVELOPMENT

The invention was made with government support under Grant Number CCF-0926127 awarded by the National Science Foundation. The government has certain rights in the invention.

BACKGROUND

Dynamic imaging may employ one of several medical imaging technologies, e.g., dynamic MRI, dynamic CT, dynamic optical imaging, and dynamic fluorescence, to acquire a time sequence of images. One of the primary uses of dynamic medical imaging is thus to examine motion, which carries with it the biological signature of malfunctions for various organs, especially the heart and the lungs. Dynamic imaging can also examine brain functions, exemplified by perfusion imaging.

Existing literature mainly employs two specific methodologies for dynamic imaging of organs such as the heart and the lungs. The first method relies on a set of static imaging acquisitions while the subject holds their breath, and resorts to image registration for retrieving the motion. The second method tries to capture free-breathing motion by using fast imaging techniques, with a trade-off between image resolution and quality.

FIG. 1A shows an example of an MRI imaging technique using traditional methods. Typically, an MRI image is obtained by sampling the object densely in Fourier space to obtain a k-space image 101. This acquired k-space image is then used to compute a real space image 103 by taking the inverse Fourier transform F* of the k-space data. However, for dynamic MRI applications, the time required to densely sample the k-space of the object is long, resulting in slow frame rates and motion induced errors. To help alleviate the above problems, the technique of compressive sensing (CS) has been used. Compressive sensing enables one to sample well below the Nyquist frequency while attaining accurate reconstruction of the original signal, under the assumption the signal is sparse in the basis under certain transforms, known as sparse transformations.

The CS process is shown graphically in FIG. 1B. In CS, the goal is to not densely sample the k-space when taking the initial image, but rather to sparsely sample the k-space as shown by the grey circles in partial k-space image 105. Rather than reconstructing the real space image using the inverse Fourier transform (a linear operator), CS relies on the existence of a non-linear sparse transform 109 ($\Psi$) to map the partial k-space image to a high resolution real space image 107. Because only a small fraction of the k-space is sampled during the sparse acquisition step, the time required to acquire a sparsely sampled k-space image 105 is less than the time required to acquire a densely sampled k-space image. Thus, CS is desirable for fast acquisition dynamic imaging. However, the success of CS depends on the existence of a suitable nonlinear transformation 109 for reconstructing a high-resolution real space image 107 from the sparsely sampled k-space image 105. Furthermore, the precise k-space measurement strategy used may contribute to the numerical robustness and/or computational difficulty of the reconstruction routine. The same may be said for CS strategies for dynamic imaging in real space, e.g., dynamic fluorescence imaging or the like.

Generally, CS may be summarized mathematically as follows. For dynamic imaging, e.g., images of a beating heart, a full resolution frame acquisition of the object would result in a sequence of full resolution video frames u(t). However, in CS u(t) is not directly measured. Rather, the CS problem may be posed as follows: given compressive measurement y(t) obtained by a series of CS measurements, recover the full resolution frames u(t) from y(t). In more mathematical terms, CS may be expressed by the following equations:

For real space: $y(t)=\Phi(t) \cdot u(t)+e(t)$, where $\Phi(t)$ is the measurement matrix taking the value of any real number and $e(t)$ is a noise term.

For Fourier space: $y(t)=\Phi(t) \cdot F(u(t))+e(t)$ where $\Phi(t)$ is the measurement matrix taking the value of where $\{0,1\}$ and $e(t)$ is a noise term.

Thus, the goal of CS is to reconstruct u(t) using the knowledge of the measurement y(t) and the measurement matrix $\Phi(t)$. Note that for CS, the number of measurements (M) taken with each compressive acquisition is much less than the dimensionality (N) of the full-resolution image being sampled, i.e., M<<N. Stated another way, in CS the number of pixels in the CS frame is much less than the number of pixels in the full-resolution frame. Thus, with the use of CS techniques, an estimate to the full-resolution image u(t) may be reconstructed from an acquisition y(t) that includes only a compressive measurement of the full-resolution image.

SUMMARY

In general in one aspect, one or more embodiments of the invention are directed to a compressive sensing system for dynamic video acquisition. The system includes a video signal interface including a compressive imager configured to acquire compressive sensed video frame data from an object, a video processing unit comprising a processor and memory. The video processing unit is configured to receive the compressive sensed video frame data from the video signal interface. The memory includes computer readable instructions that when executed by the processor cause the processor to generate a motion estimate from the compressive sensed video frame data and generate dynamical video frame data from the motion estimate and the compressive sensed video frame data. The dynamical video frame data may be output.

In general, in one aspect, one or more embodiments of the invention are directed to a method for dynamic video acquisition. The method includes obtaining frames of compressive sensed data for an object, generating motion estimates using the frames of compressive sensed data, and generating dynamical video frame data using the motion estimates and the frames of compressive sensed data by solving an optimization problem, the optimization problem including a wavelet transformation term and a total variation regularization term subject to a compressible optical flow constraint.

In general in one aspect, one or more embodiments of the invention are directed to a method for dynamic video acquisition. The method includes acquiring, by a compressive imager, frames of compressive sensed data, generating motion estimates using the acquired frames of compressive sensed data, and generating dynamical video frame data using the motion estimates and the frames of compressive sensed data by solving an optimization problem using an alternating direction augmented Lagrangian method.

Other aspects of the invention will be apparent from the following description and the appended claims.

BRIEF DESCRIPTION OF DRAWINGS

FIG. 13 shows an example of the original and reconstructed video frames that were reconstructed according to the method described in FIGS. 11-12, showing the remarkable accuracy of the method.

DETAILED DESCRIPTION

Figure 1B:
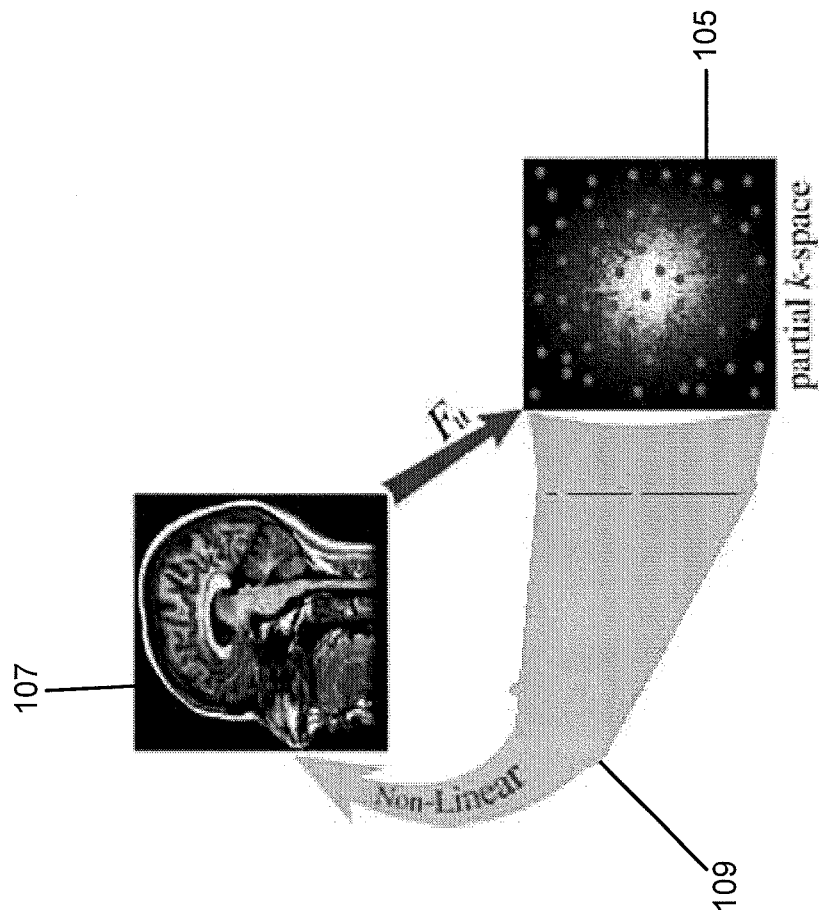
FIGS. 1A-1B shows a prior art method of image reconstruction.
Figure 1A:
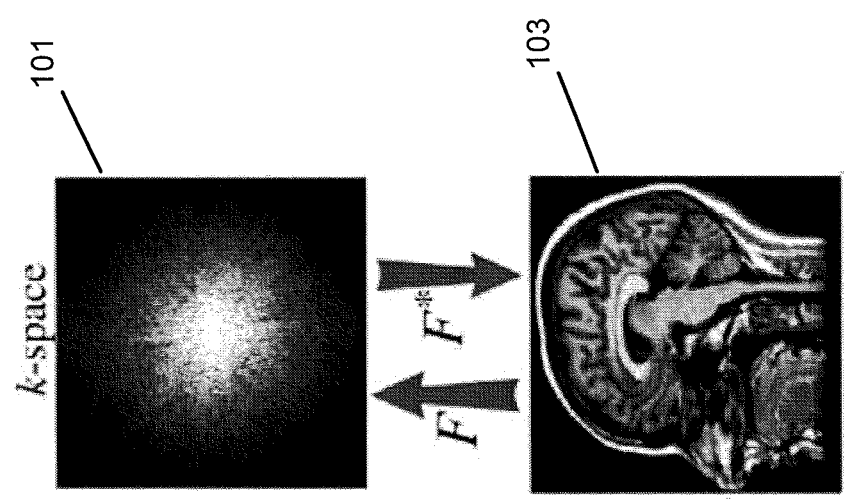

Specific embodiments of methods and systems for video compressive sensing for dynamic imaging will now be described in detail with reference to the accompanying figures. Like elements in the various figures (also referred to as FIGs.) are denoted by like reference numerals for consistency.

In the following detailed description of embodiments, numerous specific details are set forth in order to provide a more thorough understanding of video compressive sensing for dynamic imaging However, it will be apparent to one of ordinary skill in the art that these embodiments may be practiced without these specific details. In other instances, well-known features have not been described in detail to avoid unnecessarily complicating the description.

In general, embodiments of the invention relate to methods and systems for reconstructing high resolution video frame data, also referred to herein as a high resolution video frame data cube, from compressive sensed video frame data, also referred to herein as a compressive sensed video frame data cube. In one or more embodiments, the methods and systems employ multi-scale and/or time dependent compressive sensing techniques that rely, in part, on multi-scale and/or time dependent compressive sensing matrices, to acquire one or more sparsely sampled image frames, referred to herein as compressive sensed video frames, of an object being imaged. The frame data may be acquired in either Fourier space or real space. Embodiments of the invention also relate to methods and systems that may employ nonlinear numerical image reconstruction techniques to reconstruct the high resolution video frame data from the compressive sensed video frame data. In one or more embodiments, compressible optical flow and/or linear dynamical system (LDS) models may be used to compute motion estimates of the compressed sensed video frame data. In accordance with one or more embodiments, these motion estimates may then be used in the numerical reconstruction of the high-resolution video frame data from the compressive sensed video frame data to further improve the accuracy of the reconstructions. Furthermore, in accordance with one or more embodiments, the numerical reconstruction of the high-resolution video frame data may be efficiently accomplished by numerically solving an optimization problem using an alternating direction augmented Lagrangian method (ADAL), also known as the alternating direction method of multipliers (ADMM).

Figure 2:
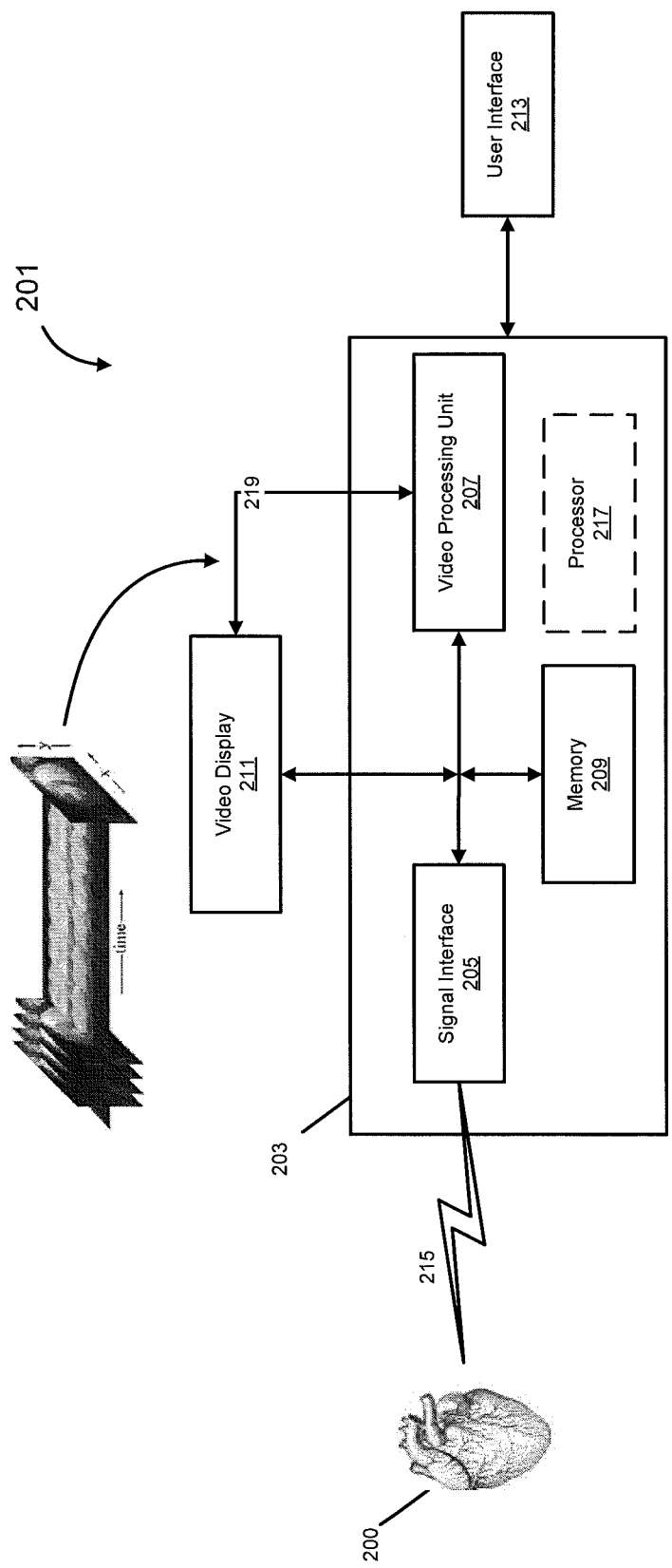
FIG. 2 shows a compressive sensing system for dynamic imaging in accordance with one or more embodiments.

FIG. 2 shows a compressive sensing system for dynamic imaging in accordance with one or more embodiments of the invention. In one or more embodiments of the invention, the dynamic imaging system includes a video acquisition system 203, a video display 211, and a user interface 213. The video acquisition system 203 is configured to receive a raw imaging signal 215 originating from a physical object 200, e.g., electromagnetic radiation, perform a compressive measurement on the raw imaging signal 215 to obtain compressive sensed video frame data, and to process, by video processing unit 207 the compressive sensed video frame data to obtain dynamical video frame data. While the video acquisition system 203 is shown in FIG. 2 as a logical group, the modules shown need not be confined in a single physical apparatus. For example, in accordance with one or more embodiments, acquisition of the raw imaging signal 215 may take place in an MRI or CT machine (associated with video acquisition system 203) and the video processing unit 203 may be housed in a physically separate computing device that, e.g., may include, one or more processors in the form of a CPU, GPU, FPGA, ASIC, or the like.

In accordance with one or more embodiments, the physical object 200 may be any physical object desired to be imaged dynamically with video, e.g., in the case of medical imaging, the physical object may be an internal organ, an embryo, a human, an animal, a biological sample, or the like. Accordingly, the raw imaging signal 215 that is received by the video acquisition system 203 may take many different forms depending on the imaging system being employed. For example if an optical imaging system is being used, the raw signal may include electromagnetic radiation in the visible spectrum, however any other type of radiation may be involved in the imaging process, e.g., infrared (IR), ultra-violet (UV), or x-rays may be used for imaging Likewise, if a magnetic resonance imaging system (MRI) is employed, the raw signal may include the radio or micro waves that are emitted from the physical object as a result of the nuclear magnetic resonance excitation process. Examples of other imaging modalities include, dynamic MRI, dynamic CT, dynamic optical imaging, dynamic fluorescence imaging, and dynamic hyperspectral imaging. The video acquisition system 203 is not limited to any particular imaging modality. Furthermore, the video acquisition system 203 may include the computational hardware typically used in such systems, one or more computer readable media in the form of computer memory and one or more processors, e.g., in the form of a CPU, GPU, ASIC, FPGA, or the like. The imaging modalities provided here are provided merely for the sake of example. Any dynamic imaging modality and/or system may be used without departing from the scope of the present disclosure.

In view of the above, the video acquisition system 203 may take many forms with respect to the hardware components used to detect the raw imaging signal 215 from the physical object 200. In accordance with one or more embodiments, the video acquisition system 203 may include a signal interface 205 that includes the signal detection hardware. For example, in accordance with one or more embodiments, the signal interface 205 may include MRI detection coils, an x-ray detector, a digital imaging chip (e.g., a CCD detector, CMOS detector, or the like), or a single pixel detector. Furthermore, depending on the imaging system, the signal interface will detect compressive sensed video frame data as real space data (points in real space, e.g., (x,y)) or Fourier space data (points in k-space, e.g., $(k_x, k_y)$). As used herein, real space refers to one, two, or three dimensional data where the dimensionality of the data corresponds to the dimensionality of the object in physical space, e.g., a set of (x,y,z) points on the object for the case of 3D real space data. As used herein, the term k-space is used to refer to imaging systems that acquire data in Fourier space (understood as the Fourier transform of the real space). Dynamic MRI and dynamic CT fall into the Fourier space category, for different reasons. For MRI, the image sequences are taken in the Fourier space directly, therefore the acquired data is Fourier space data. While dynamic CT is acquired in real space, the specific geometry of the sampling process leads to the equivalence of the radon transformed data with the Fourier space data. On the other hand, dynamic optical imaging, dynamic fluorescence imaging, and dynamic hyperspectral imaging fall into the category of real space imaging, due to the physical space of the acquisition process and sampling pattern.

Returning to FIG. 2, in accordance with one or more embodiments, the signal interface 205 detects the raw imaging signal 215 and outputs compressed video frame data, i.e., a time series of compressive sensed video frames, to video processing unit 207. Accordingly, in accordance with one or more embodiments, the signal interface 205 also includes the necessary hardware and/or software to cause the signal interface 205 to obtain compressive sensed video frame data. This data may be obtained directly, e.g., through the use of a compressive sensor (not shown), may be obtained from previously acquired full resolution video frame data by down-sampling the full resolution video frame data, or may use a specially designed acquisition sequence to acquire the compressive sensed data. In accordance with one or more embodiments, the compressive sensor may be a single pixel camera, a flexible voxel camera, or a programmable pixel compressive camera (P2C2), or any other camera that relies on the theory of compressive sensing. In one example, the signal interface 205 may include a spatial-multiplexing camera that acquires random, or coded projections of a scene using, e.g., a digital micro-mirror device (DMD) or liquid crystal on silicon (LCOS) spatial light modulator in combination with a detector, such as a few, or single pixel detector, or a full frame multi-pixel detector. In accordance with one or more embodiments, e.g., for MRI and CT scanners, software instructions stored on the memory 209 may program an acquisition sequence that results in the sampling of the object 200 according to the requirements of a CS strategy.

Video processing unit 207 receives the compressive sensed video frame data and generates high resolution video frame data from the compressive sensed video frame data. Furthermore, in accordance with one or more embodiments, video processing unit 207 may also generate a low resolution preview of the compressive sensed video frame data in addition to generating the high resolution video frame data. As used herein, the terms high and low resolution are used as descriptive terms to enforce that notion that a high-resolution video frame data includes more pixels per frame than a low resolution video frame. The precise number of pixels in each type of frame will of course vary with the application. In accordance with one or more embodiments, the low resolution previews may be output by the video processing unit 207 in real time to the video display system 211, as the compressive sensed frames are acquired. Thus, in accordance with one or more embodiments, the low resolution previews may be optionally inspected by a user and be used to guide the data acquisition process and/or sampling strategy in real time.

In accordance with one or more embodiments, the video acquisition system 203 may include one or more processors 217 operably coupled to one or more memories 209. The processors 217 are included as optional in FIG. 2 to signify that the processors 217 may be located within the acquisition in some way. For example, one or more of the processors 217 may located as shown, and/or may be located within any part of the video acquisition system, e.g., within the signal interface 205 and/or within the video processing unit 207. In accordance with one or more embodiments, the processors 217 may be any processor known in the art, e.g., a central processing unit (CPU), application specific integrated circuit (ASIC), a field programmable gate array (FPGA), or the like. Further, in accordance with one or more embodiments, software running on the processor(s) may perform the method for reconstructing the high-resolution video frames from the compressive sensed video data cube, as described in more detail below in reference to FIGS. 7-8 and 11-12.

In accordance with one or more embodiments, a time series of compressive sensed video frames, referred to herein as the compressive sensed video data cube may be accumulated in the memory 209 as the frames are acquired by the signal interface 205. Furthermore, a portion of, or the whole video cube, may be output to the video processing unit 207 for processing as described in detail below. In accordance with one or more embodiments, the video processing unit may compute a motion estimate using the compressive sensed video data cube and then reconstruct a high-resolution video data cube 219 from the combination of the compressive sensed video data, the measurement matrix, and the motion estimate.

In accordance with one or more embodiments, the video acquisition unit 203 is operatively connected to a user interface 213, e.g., a keyboard, touchscreen, mouse, or the like, in order to receive user input.

In accordance with one or more embodiments, the high resolution video frame data 219 may be reconstructed from the compressive sensed video frame data by the video processing unit 207, using methods and systems that employ motion compensated multi-scale recovery, as described in detail below in reference to FIGS. 3-8 and/or using methods and systems that employ video reconstruction on a motion manifold under a joint structured sparsity assumption, as described in detail in reference to FIGS. 9-13.

Motion Compensated Multi-Scale Recovery

Figure 3:
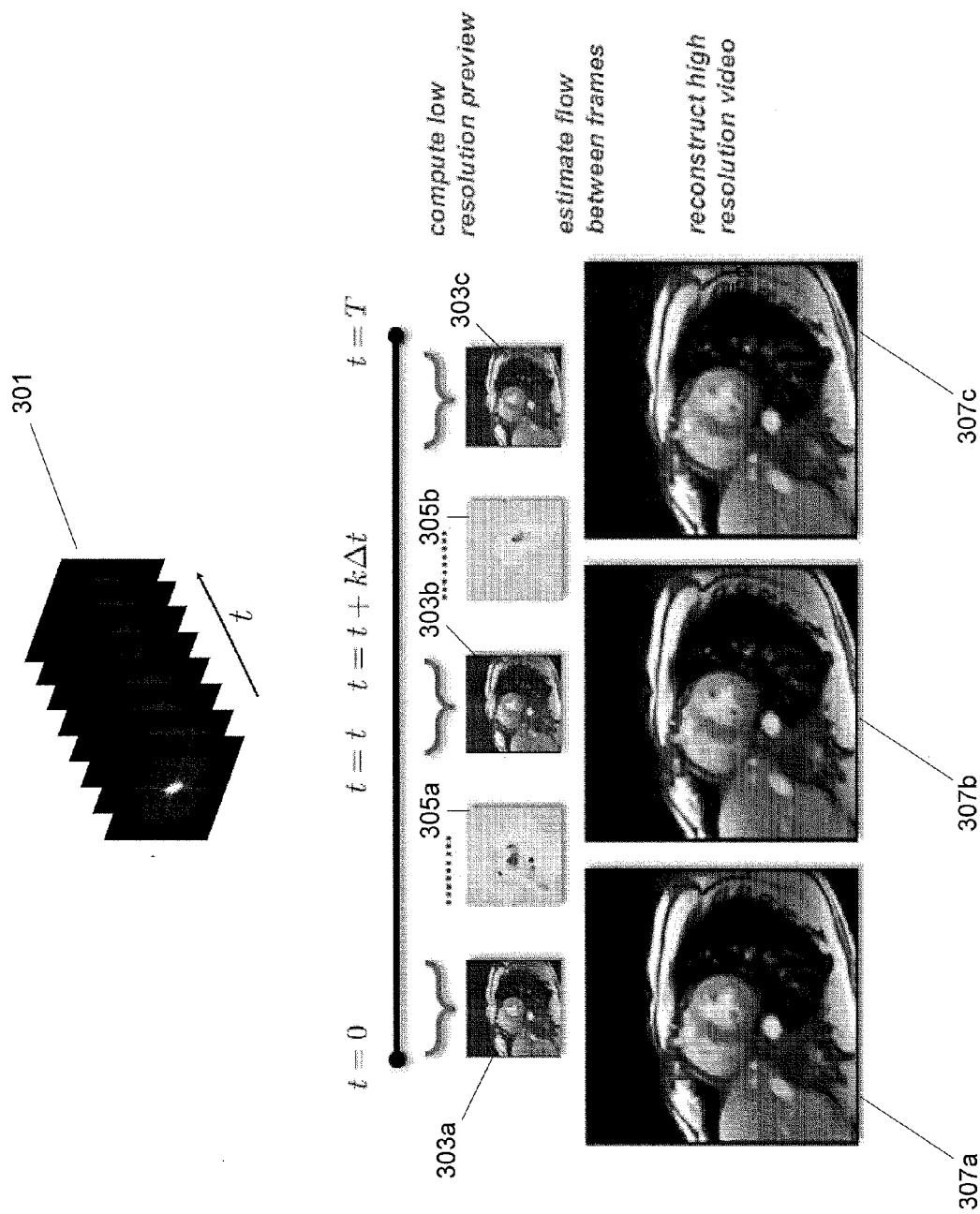
FIG. 3 shows a high level description of a method of video compressive sensing for dynamic imaging that employs motion compensated multi-scale recovery in accordance with one or more embodiments.

FIG. 3 shows a high level description of a method of video compressive sensing for dynamic imaging that employs motion compensated multi-scale recovery in accordance with one or more embodiments. FIG. 3 shows one possible application of the method of dynamic medical imaging of the human heart, e.g., using a video acquisition unit in the form of a dynamic MRI system. In accordance with one or more embodiments, a series of k-space compressive sensed frames 301 are acquired by the video acquisition unit of the MRI system, starting at t=0 and ending at t=T. The video processing unit generates low resolution previews 303a-303c for a subset of the compressive sensed data frames, e.g., by inverse Fourier transforming a densely sampled low frequency portion of the compressive sensed data frame, e.g., as shown graphically in FIG. 5, and described below in more detail. In accordance with one or more embodiments, each low resolution preview frame 303a-303c may be computed using an aggregated subset of compressive sensed frames located within a predefined time window, e.g., all the frames found within the time t and t+kΔt, as shown in FIG. 3. In accordance with one or more embodiments, adjustability of the time window by the user allows for the ability to choose a window that may produce the best reconstruction result and/or facilitate a higher compression rate than frame-by-frame reconstruction.

In accordance with one or more embodiments, the video processing unit generates motion estimates 305a-305b between preview frames, e.g., using a compressive optical flow model. These motion estimates may be used to determine a motion constraint to be used for the high-resolution reconstruction. The video processing unit may reconstruct the high-resolution reconstructed frames 307a-307c from the compressive sensed data frames using the computed motion constraints as the constraints for an optimization problem. This optimization based method is described in further detail below in reference to FIGS. 7-8.

Figure 4:
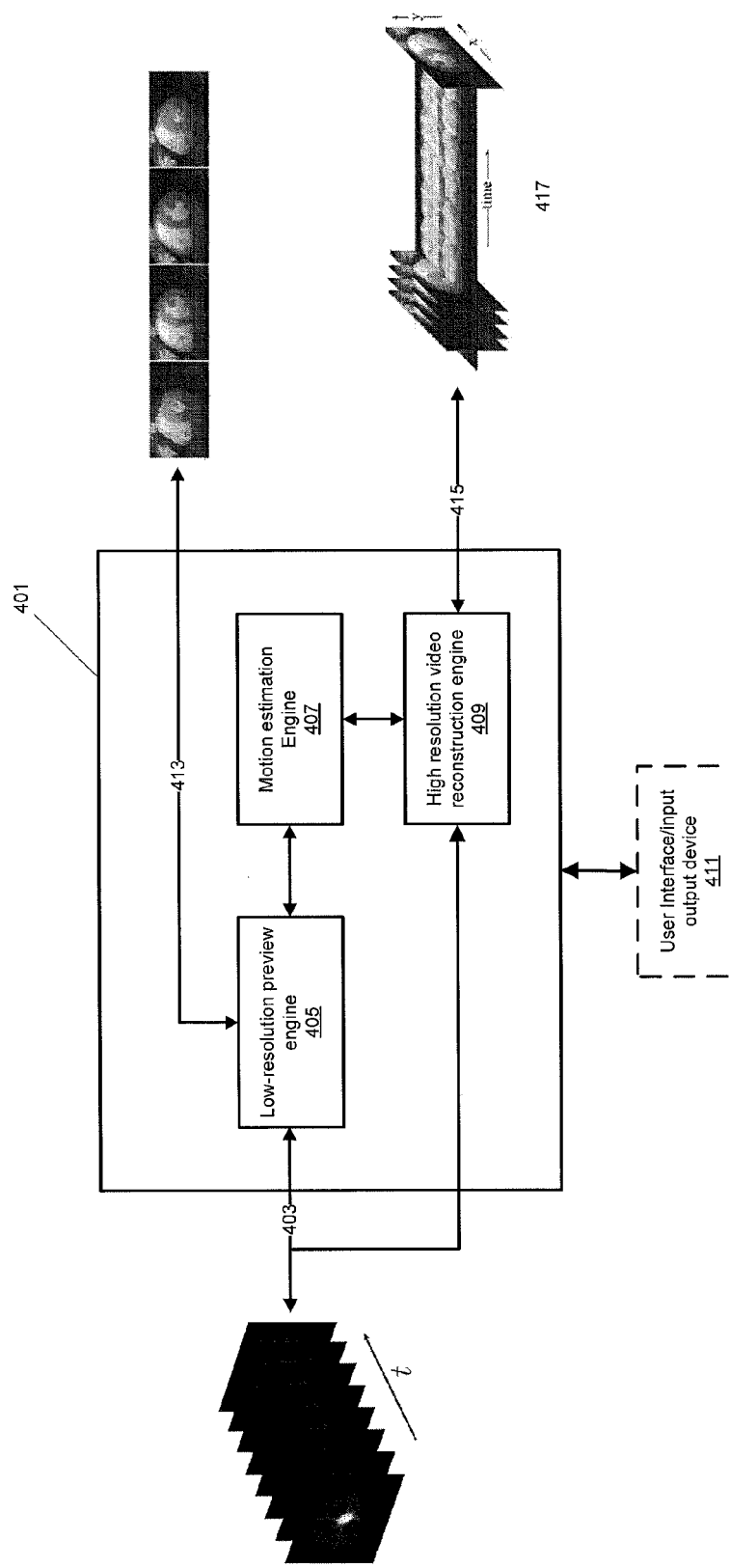
FIG. 4 shows a video processing unit for dynamic imaging that employs motion compensated multi-scale recovery in accordance with one or more embodiments.

FIG. 4 shows a video processing unit for use in the video acquisition system in accordance with one or more embodiments of the invention. More specifically, FIG. 4 shows a video processing unit for dynamic imaging that employs motion compensated multi-scale recovery, which is a high resolution video reconstruction method described in more detail below in reference to FIGS. 6-7. One or more embodiments of the video processing unit 401 and its components may be implemented using hardware, software, or any combination thereof. If implemented in software, the software may be stored on a computer readable medium, e.g., memory 209 of video acquisition system 203, or any other suitable memory operably connected to the video processing unit 401. Furthermore, the software may be executed by the one or more processors of the video acquisition system, e.g., processors 217 shown in FIG. 2, to perform the video reconstruction method in accordance with one or more embodiments.

In accordance with one or more embodiments, the video processing unit 401 includes a low resolution preview engine 405, a motion estimation engine 407, a high-resolution video reconstruction engine 409, and an optional user interface/input device 411. In accordance with one or more embodiments, the low resolution preview engine 405 may receive, in real time, compressive sensed video frame data 403, e.g., the frame data acquired by the signal interface 205 described above in reference to FIG. 2. In accordance with one or more embodiments, the low resolution preview engine may acquire and aggregate one or more compressive sensed frames and then output a low resolution preview 413 of the frame, or frames, in real time. For example, the low resolution preview engine may construct low resolution preview(s) 413 of the video frame(s) as described below in reference to FIGS. 5 and 7. The low resolution previews 413 may be output to a display (not shown) for viewing during image acquisition.

Motion estimation engine 407 is configured to receive the low resolution previous from low resolution preview engine 405 and to generate a motion estimation model based on the low resolution previews. For example, using a compressible optical flow model, a displacement vector field is computed to estimate the motion of the object between two of the low resolution preview frames. One example of the method by which the motion estimation engine produces a motion estimation model is described in more detail below in reference to FIG. 7. Motion estimation engine 407 is configured to output motion estimation model to the high resolution video reconstruction engine 409. In addition the high resolution video reconstruction engine 409 is configured to receive the compressive sensed video frame data 403 and the motion estimate model. In accordance with one or more embodiments, the compressive sensed video frame data 403 may include both the frame data from the compressive measurement, referred to herein as either y(t) or z(t), and the measurement matrix, referred to herein as Φ. The high resolution video reconstruction engine 409 may then reconstruct frames of high resolution video data 415 from the compressive sensed video frame data 403 by solving an optimization problem that employs the motion estimation model as a constraint. One example of the method by which the high resolution video reconstruction engine 409 may reconstruct frames of high resolution video 415 from the compressive sensed video frame data 403 is described in more detail below, e.g., in reference to FIGS. 7-8. In accordance with one or more embodiments, the frames of high resolution video may be output for display. In accordance with one or more embodiments, the frames of the high resolution video data form a video data cube 417.

Figure 5:
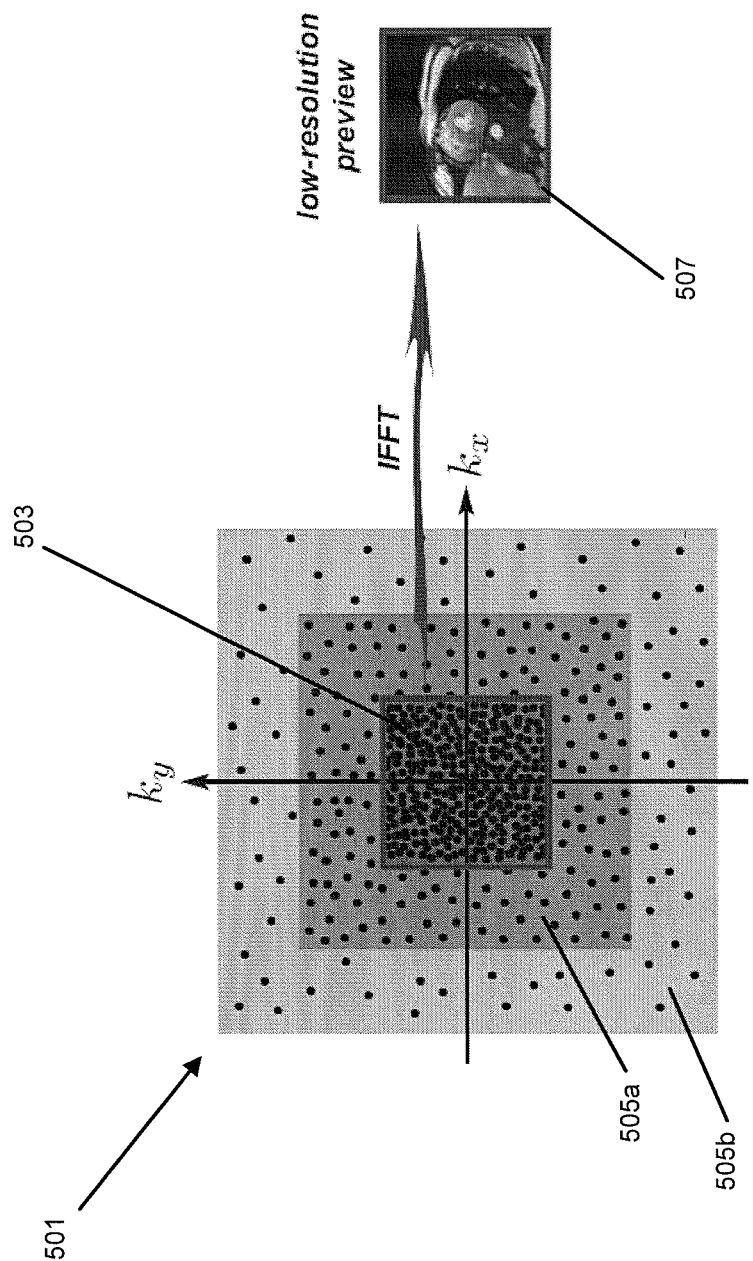
FIG. 5 shows a multi-scale sensing matrix in accordance with one or more embodiments that may be used to employ compressive sensing in accordance with one or more embodiments.

FIG. 5 shows a multi-scale sensing matrix 501 in accordance with one or more embodiments that may be used to employ CS in accordance with one or more embodiments. For example, in accordance with one or more embodiments, the signal interface 205 may employ a multi-scale sensing matrix like the one shown in FIG. 5. For simplicity, FIG. 5 graphically illustrates a three scale sensing matrix in a two dimensional k-space. While a two dimensional measurement space is shown, three dimensional sampling may also be employed without departing from the scope of the present disclosure.

For example, a sensor employing a multi-scale sensing matrix may be mathematically described as follows:

$$y(t) = \begin{bmatrix} y^L(t) \\ y^{H_1}(1) \\ y^{H_2}(1) \\ \vdots \\ y^{H_n}(t) \end{bmatrix} = \begin{bmatrix} \Phi^L(t)F(u(t)) \\ \Phi^{H_1}(t)F(u(t)) \\ \Phi^{H_2}(t)F(u(t)) \\ \vdots \\ \Phi^{H_n}(t)F(u(t)) \end{bmatrix} + e(t) \quad (1)$$

where y(t) is the compressive sensed frame at time t, e(t) is the measurement noise at time t, and u(t) is the full resolution image, i.e., the image that is to be reconstructed based on the compressive measurement. Stated another way, at each time instant, the data acquired, e.g., the compressive sensed frame is f(t), and may be described as the inner product between the measurement matrix $\Phi^n(t)$ and the Fourier transform F(•) of the full resolution image u(t), plus some noise e(t). In this example, the low frequency component of the multi-scale sensing matrix, denoted by $\Phi^L(t)$, is designed to facilitate efficient computation of low-resolution previews. The high frequency component of the multi-scale sensing matrix, denoted by $\Phi^H(t)$, is designed to randomly sample the high-frequency components of u(t) such that, in combination, the low frequency and high frequency components may be used to reconstruct the high-resolution video frames. In accordance with one or more embodiments, the high-frequency components may be structured randomly sampled. As used herein, structured randomly sampled refers to a case where the probability density function of the random distribution may follow a certain structure, or the random patters may be subject to a trajectory constraint posed by the imaging hardware, e.g., the sampling pattern may randomly jitter about a defined sequence to obtain some randomness in the acquisition. To take the case of MRI as an example, the acquisition strategy may result in a sampling sequence that jitters about a Cartesian sequence, radial sequence, or spiral sequence, as described in further detail below in reference to FIGS. 6A-6C.

Furthermore, the three scale sampling matrix of this example may be extended to multiple scales without departing from the scope of the present disclosure. More specifically, in a multi-scale embodiment, a low-resolution preview may be computed using the low frequency component, and then samples from the intermediate frequency components may be used to compute a median-resolution video. Higher frequency samples may be incorporated at each stage to obtain higher and higher resolution until the full resolution video frames are obtained.

In accordance with one or more embodiments, and as already described, low-resolution previews, e.g., previews 303a-303b shown in FIG. 3 and/or previews 413 shown in FIG. 4 may be computed using subset of the compressive sensed data frames. This process, for one frame, is shown graphically in FIG. 5, where the low frequency domain 503 is sampled fully, and the high frequency domains 505a and 505b are sampled more sparsely. As used herein a fully sampled domain refers to a domain sampled on a grid wherein all the points of the domain grid are sampled. The low-resolution preview 507 may be efficiently and accurately computed based on the low-frequency samples from the low frequency domain 503. In accordance with one or more embodiments, the low resolution preview 507 may be computed by taking the inverse Fourier transform (IFFT) of the low frequency domain 503.

Figure 6A:
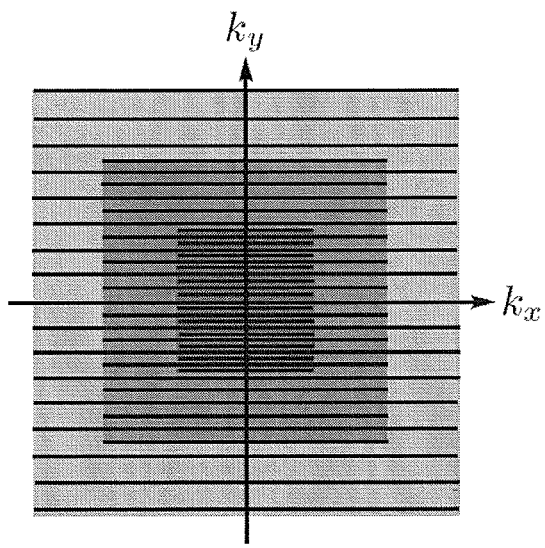
FIGS. 6A-6C show three types of measurement strategies, or trajectories, for imaging sequences that may be employed by the signal interface in accordance with one or more embodiments.
Figure 6B:
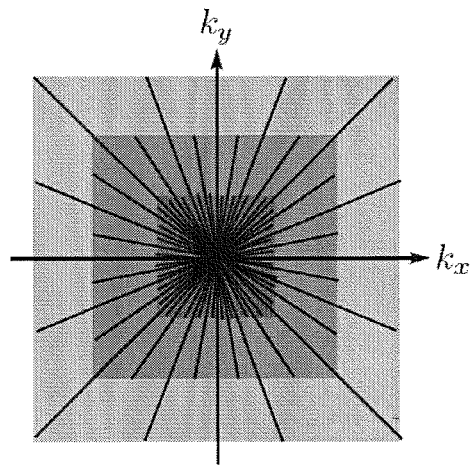
Figure 6C:
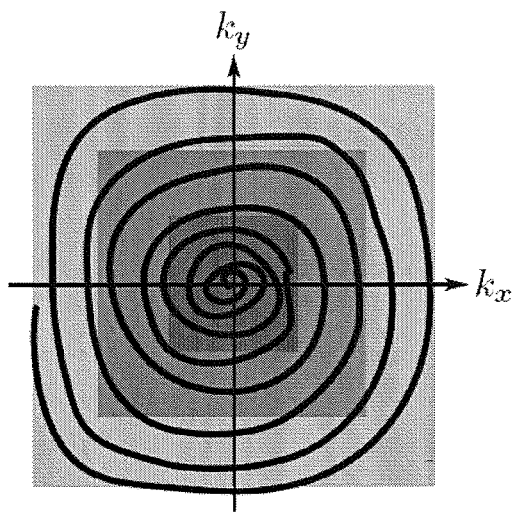

FIGS. 6A-6C show three types of measurement strategies, or trajectories, for imaging sequences that may be employed by the signal interface in accordance with one or more embodiments. FIG. 6A illustrates a multi-scale sensing matrix in the Cartesian sequence. In this example, as in the others, the Fourier domain is shown in 2D for simplicity. However, this concept can be extended to 3D and higher without departing from the scope of the present disclosure. The measurement strategy shown in FIG. 6A may be accomplished, e.g., using the cine sequence for MRI. The low frequency domain is sampled fully, and high frequency domain is sampled more sparsely and randomly. FIG. 6B shows a multi-scale sensing matrix in the polar sequence. FIG. 6C illustrates a multi-scale sensing matrix in the spiral sequence. In accordance with one or more embodiments, for the above three sequences, the actual samples can be made more random by jittering along the trajectories shown in the figures. In addition, the lines in the k-space do not necessarily have to be equispaced and the lines are drawn here as equispaced merely for the sake of simplicity.

Furthermore, in a case where the low frequency samples are not fully sampled, as described above, the low-resolution previews may be efficiently computed by solving an optimization problem, as described in more detail below. In addition, if the imaging modality employed samples data in real space, rather than Fourier space, an optimization problem, e.g., least-squares optimization with an L1, L2, or TV regularization may be used to compute the previews. Furthermore, in accordance with one or more embodiments, in the case of real space sampling, the measurement matrix may be designed to allow for efficient and accurate computation of the previews, e.g., using a Hadamard matrix as described in Sankaranarayanan, et al. "CS-MUVI: Video Compressive Sensing for Spatial-Multiplexing Cameras," IEEE Intl. Conf. on Comp. Photo., Seattle, Wash. (2012).

Furthermore, without departing from the scope of the present disclosure, any number of different types sampling strategies may be used. For example, for dynamic medical imaging applications, further tuning of the measurement matrix towards the physical constraints of the sequence is desirable, e.g., for the case of CT imaging, compressive sensing results in a set of angular measurements, where only a few angles in the gantry rotation are used for acquisition as opposed to taking all angles as is the case with non-compressive CT imaging. In addition, the sampling matrix may be adaptable in that, it may be modifies in real time based on real time low-resolution previews.

Figure 7:
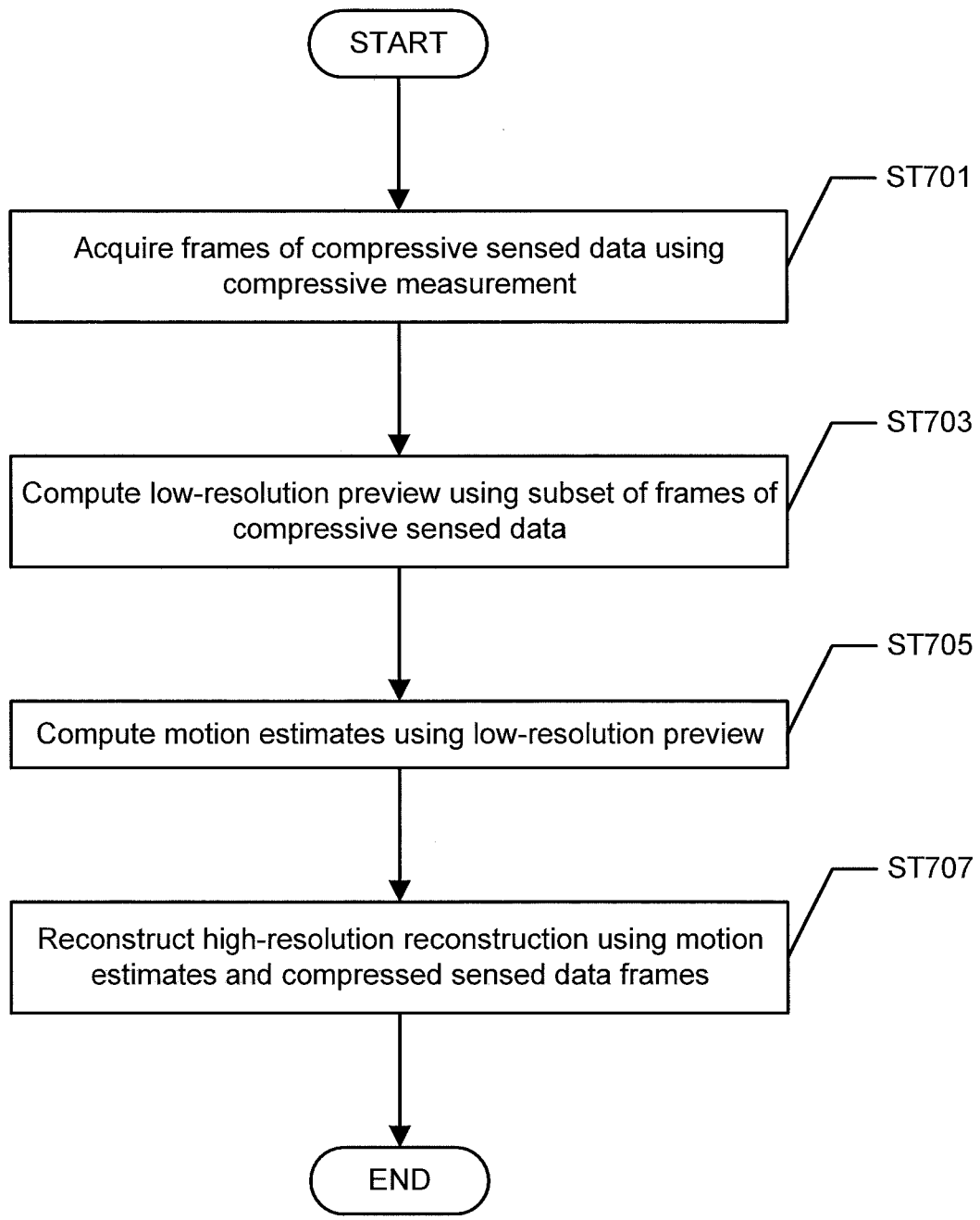
FIG. 7 shows a method of video compressive sensing for dynamic imaging that employs motion compensated multi-scale recovery in accordance with one or more embodiments.

FIG. 7 shows a flow chart describing a method in accordance with one or more embodiments of the invention. More specifically, FIG. 7 shows a method of video compressive sensing for dynamic imaging that employs motion compensated multi-scale recovery in accordance with one or more embodiments.

In step 701, frames of compressive sensed data are acquired by a compressive sensor. For example, the frames of compressive sensed data may be acquired using a compressive sensor that employs a multi-scale sensing matrix embodied in hardware and/or software as described above in reference to FIGS. 2-6. In accordance with one or more embodiments, a multi-scale Fourier matrix, like those shown in FIGS. 5-6, may be used to allow for efficient estimation of low-resolution previews from the frames of compressive sensed data. As used herein, a multi-scale sensing matrix refers to the hardware and/or software associated with a compressive sensor, e.g., a spatial light modulator, or, in some embodiments, may be associated with the software that determines an acquisition sequence of a dynamic imaging device that employs a CS acquisition strategy. For example, a dynamic video acquisition sequence of a dynamic MRI system that causes the excitation coil and measurement coils to sample low-frequency samples in the k-space fully on a Cartesian grid, and also samples randomly the high-frequency samples where the random pattern may or may not change with time.

In step 703, low-resolution previews are computed based on a subset of compressive sensed video frames. In accordance with one or more embodiments, when the low-frequency components are sampled fully, the low-resolution previews may be computed via inverse Fourier transform, essentially in closed-form solution. For example, this process, for one frame is shown graphically and described above in reference to FIG. 5. In accordance with one or more embodiments, the method of using inverse Fourier transform may apply to random Fourier undersampling on a uniform grid and also to the Cartesian sampling sequence, e.g., shown in FIG. 6A. In accordance with one or more embodiments, if the low frequency samples in the Fourier space are not sampled fully, the low-resolution previews may still be computed in step 703 using some form of regularized reconstruction. For example, the low-resolution previews may be obtained by solving a constrained optimization problem. For example, in the case of real space sampling the following optimization problem may be solved to obtain the low resolution preview $u^L$:

$$u^L \leftarrow \operatorname*{argmin}_u \frac{1}{2}\|y^L - \Phi^L u\|_2^2 + \lambda R(u) \tag{3}$$

where R(u) is a regularization term.

For Fourier space sampling, the following optimization problem may be solved to obtain the low resolution preview $u^L$:

$$u^L \leftarrow \operatorname*{argmin}_u \frac{1}{2}\|y^L - \Phi^L F(u)\|_2^2 + \lambda R(u) \tag{4}$$

where R(u) is a regularization term.

Depending on the nature of the image and sampling pattern, the regularization term R(u) may be chosen to be any appropriate type of regularization, e.g., L2, L1, TV regularization, or the like, which may be written as follows:

$$L2 \text{ regularization } R(u) = \|u\|_2^2 \tag{5}$$

$$L1 \text{ regularization } R(u) = \|u\|_1 \tag{6}$$

$$TV \text{ regularization } R(u) = TV(u) \tag{7}$$

where the total variation TV( ) is defined and discussed in more detail below in the section titled Total Variation.

Returning to FIG. 7, in step 705, a motion estimate is computed using the low-resolution preview. In accordance with one or more embodiments, the motion estimate is based on a compressible optical flow model. Generally speaking, optical flow models represent a class of non-parametric methods to model motion by estimating the velocity vector field of pixels between consecutive frames of an image sequence. In other words, if u(x,t) represents a frame at time t, the frame at a different time t+δt may be modeled as u(x+q(x), t+δt), where q denotes the velocity field, $q:\Omega \to \mathbb{R}^d$.

$$q:=(q_1, q_2, \ldots, q_d) \text{ with } q_1, q_2, \ldots, q_d:\Omega \to R \tag{8}$$

where $\Omega \subset \mathbb{R}^d$ is defined to be a rectangular domain whose points are denoted by $x=(x_1, x_2, \ldots, x_d) \in \Omega$. In accordance with one or more embodiments, a conservation of mass assumption, as opposed to the traditional constant brightness assumption, is used to determined the velocity field q from the low resolution previews. The conservation of mass assumption used in accordance with one or more embodiments may be written as $$\int_\Omega u(x,t)dx = \int_\Omega u(x+q(x),t+\delta t)dx \tag{9}$$

Differentiation and linearization of the above equation leads to the continuity equation $$\frac{\partial u}{\partial t} + \nabla \cdot (qu) = 0 \tag{10}$$

which is equivalent to $$\frac{\partial u}{\partial t} + q \cdot \nabla u + u \nabla \cdot q = 0 \tag{11}$$

where $\nabla \cdot$ is the divergence operator. Note that the continuity equation above differs from the traditional constant brightness optical flow model by the third term. This can be seen by noting that one recovers the (constant brightness) optical flow equation by assuming that the velocity field is divergence free, $$\nabla \cdot q = 0 \text{ for } u > 0 \tag{12}$$

In other words, standard optical flow assumes that the flow is incompressible. However, for many medical imaging applications, compressibility is inherent to many of the biological samples being observed, therefore the compressive optical flow model disclosed herein may be a more reliable model than standard (i.e., incompressible, constant brightness) optical flow models for use in certain dynamic medical imaging applications.

Returning to step 705, based on the compressible optical flow model set forth above, the velocity field q may be determined by solving an optimization problem. For example, in accordance with one or more embodiments, a global approach may use global minimization of an energy function that includes a fidelity term and a regularization term. On the other hand, a local approach may estimate the displacement vector field at a certain pixel by only using information within the local neighbors $N(x) \subset \Omega$ of each pixel in the reference image. In accordance with one or more embodiments, a combined local and global approach may be employed that leverages the advantages of the local and global methods: noise robustness of the local method and the dense velocity field of the global method. In accordance with one embodiment, the optimization problem used to determine q is deemed the combined compressible local global (CCLG) mass flow and may be stated as $$\min_q \int_\Omega \int_\Omega \delta_\sigma(x, y)(\partial_t u(y) + q(x) \cdot \nabla u(y) + u(y) \nabla \cdot q(x))^2 dx dy + \tag{13}$$

-continued $$\alpha \int_\Omega \sum_{i=1}^d |\nabla q_i(x)|^2 \, dx$$

where $\delta_\sigma$ denotes a Gaussian patch centered at x with a standard deviation σ, thereby defining the local neighborhood N(x). In accordance with one or more embodiments, Eq. (13) may be solved using ADAL or primal-dual method. However, any other method may be used without departing from the scope of the present disclosure.

In accordance with one or more embodiments, when dealing with large displacements, the CCLG approach may be replaced by a mass preserving warping approach.

In the mass preserving warping method, the following functional may be minimized:

$$\operatorname*{argmin}_T \int (u_j \circ T - u_i)^2 dx + \lambda \int \|T(x) - x\|^2 m_i dx \qquad (14)$$

where the mapping is between two video frames $u_i$ and $u_j$, and the corresponding density maps as $m_i$ and $m_j$. Furthermore $u \circ T = T(u)$, where the mapping between the two image domains is defined as $T: \Omega_1 \to \Omega_j$.

Numerical details for how to solve Eq. (14) and its variants may be found for example in, Haker et al., "Optimal mass transport for registration and warping," International Journal of Computer Vision, 60(3), pp. 225-240 (2004) and Gigengack et al., "Motion correction in dual gated cardiac PET using mass-preserving image registration," IEEE Trans Medical Imaging, 31(3), pp. 698-712 (2012).

Once the motion estimate q is determined in step 705, the high-resolution reconstruction may commence. In step 707, the high-resolution reconstructed frames are obtained using the motion estimate q, the compressed sensed data frames y(t), and the measurement matrix Φ(t). More specifically, in accordance with one or more embodiments, given the motion constraints q, all the high-resolution video frames may be reconstructed by solving a convex optimization problem with a mixture of wavelet sparsity as well as total variation (TV), along with two fidelity terms. The fidelity terms (a) enforce the consistency of compressive measurements using L2 square loss, and (b) impose the estimated flow between consecutive frames. In the case of compressible optical flow, the convex optimization problem solved in step 707 may be stated as follows:

For real space:

$$\min_u \lambda J(u) + \mu \|\Psi(u)\|_1 \qquad (15)$$

$$\text{s.t.} \int_0^T \int_\Omega (\Phi \cdot u - y)^2 dx dt \leq \delta$$

$$\partial_t u + q \cdot \nabla u + u \nabla \cdot q = 0$$

For Fourier space:

$$\min_u \lambda J(u) + \mu \|\Psi(u)\|_1 \qquad (16)$$

$$\text{s.t.} \int_0^T \int_\Omega (\Phi \cdot Fu - y)^2 dx dt \leq \delta$$

$$\partial_t u + q \cdot \nabla u + u \nabla \cdot q = 0$$

where Ψ(•) denotes the wavelet transform and J(•) denotes the TV regularization. Of note is the nonlinear form of the above constraints. While the above optimization problems may be solved subject to the nonlinear form of the constraints, one or more embodiments may alternatively employ a linearization of the constraint as follows. Starting from the integrated form of mass continuity equation, $$u(x+q, t+\delta t) = u(x,t) e^{-\nabla \cdot q(x,t)} \qquad (17)$$

the equation may be rewritten as $$u(x_1+q_1, x_2+q_2, \ldots, x_d+q_d, t+\delta t) = u(x_1, x_2, \ldots, x_d, t) k(x,t) \qquad (18)$$

where $k(x,t) = e^{-\nabla \cdot q(x,t)}$. Then defining $\bar{x}_i = x_i + q_i$, with $i=1, 2, \ldots, d$, leads to the following equation for the linear constraint:

$$u(\bar{x}_1, \bar{x}_2, \ldots, \bar{x}_d, t+\delta t) = u(x_1, x_2, \ldots, x_d, t) k(x,t), \qquad (19)$$

where $$\begin{bmatrix} 1 & 0 & \cdots & 0 & q_1 \\ 0 & 1 & \cdots & 0 & q_2 \\ 0 & 0 & \cdots & 1 & q_d \\ 0 & 0 & \cdots & 0 & 1 \end{bmatrix} \begin{bmatrix} x_1 \\ x_2 \\ x_d \\ 1 \end{bmatrix} = \begin{bmatrix} \bar{x}_1 \\ \bar{x}_2 \\ \bar{x}_d \\ 1 \end{bmatrix} \qquad (20)$$

Returning to the form of the optimization problem solved in step 707, for the case of mass preserving warping, the convex optimization problem may be stated as follows:

For real space:

$$\min_u \lambda J(u) + \mu \|\Psi(u)\|_1 \qquad (21)$$

$$\text{s.t.} \int_0^T \int_\Omega (\Phi \cdot u - y)^2 dx dt \leq \delta$$

$$u_{i+1} \circ T_i = u_i$$

where $T_i$ is the mass preserving mapping.

For Fourier space:

$$\min_u \lambda J(u) + \mu \|\Psi(u)\|_1 \qquad (22)$$

$$\text{s.t.} \int_0^T \int_\Omega (\Phi \cdot Fu - y)^2 dx dt \leq \delta$$

$$u_{i+1} \circ T_i = u_i$$

where $T_i$ is the mass preserving mapping.

In accordance with one or more embodiments, all the above forms of the optimization problems of step 707 may be solved by way of an alternating direction augmented Lagrangian method (ADAL), formulated as follows:

For compressible optical flow:

$$\min_u \lambda J(u) + \mu \|\Psi(u)\|_1 + \qquad (23)$$
$$\int_0^T \int_\Omega (\Phi(t) \cdot F(u(t)) - y(t))^2 dx dt + \beta \int_0^T \left( \frac{\partial u}{\partial t} - \nabla \cdot (uq) \right) dt$$

where Φ(u) denotes the wavelet transform on u, and J(u) denotes the total variation of u.

For mass preserving warping:

$$\min_u \lambda J(u) + \mu \|\Psi(u)\|_1 + \qquad (24)$$
$$\int_0^T \int_\Omega (\Phi(t) \cdot F(u(t)) - y(t))^2 dx dt + \beta \int_0^T (u(t+1) - T(t)u(t)) dt$$

where $\Phi(u)$ denotes the wavelet transform on u, and J(u) denotes the total variation of u.

In what follows, the sum of the last two fidelity terms is denoted by H(u,y,q) such that Eq. (23) and (24) may both be written compactly as $$\min_u \lambda J(u) + \mu \|\Psi(u)\|_1 + H(u, y, q) \qquad (25)$$

Because the energy between the wavelet sparsity and TV regularization term is coupled, additional variables and their associated proximal terms may be introduced to decouple the energy by way of the ADAL. Accordingly by introducing the new variables w=Du and v=Φ(u), where D is the discrete gradient operator of u at index i, the original optimization problem Eqn. (25) becomes $$\min_u \mu \|\Psi(u)\|_1 + \lambda J(u) + H(u, y, q) \qquad (26)$$
$$\text{s.t.} \quad w = Du$$
$$v = \Psi u$$

and the augmented Lagrangian becomes $$\min_{w,v,u} \lambda \|w\|_p + \mu \|v\|_1 + H(u, y, q) + \qquad (27)$$
$$\frac{\beta}{2} \|w - Du - b\|_2^2 + \frac{\beta}{2} \|v - \Psi(u) - d\|_2^2$$

In accordance with one or more embodiments, the augmented Lagrangian of Eq. (27) may be efficiently solved by first splitting the problem into the W, V, and U sub-problems.

Figure 8:
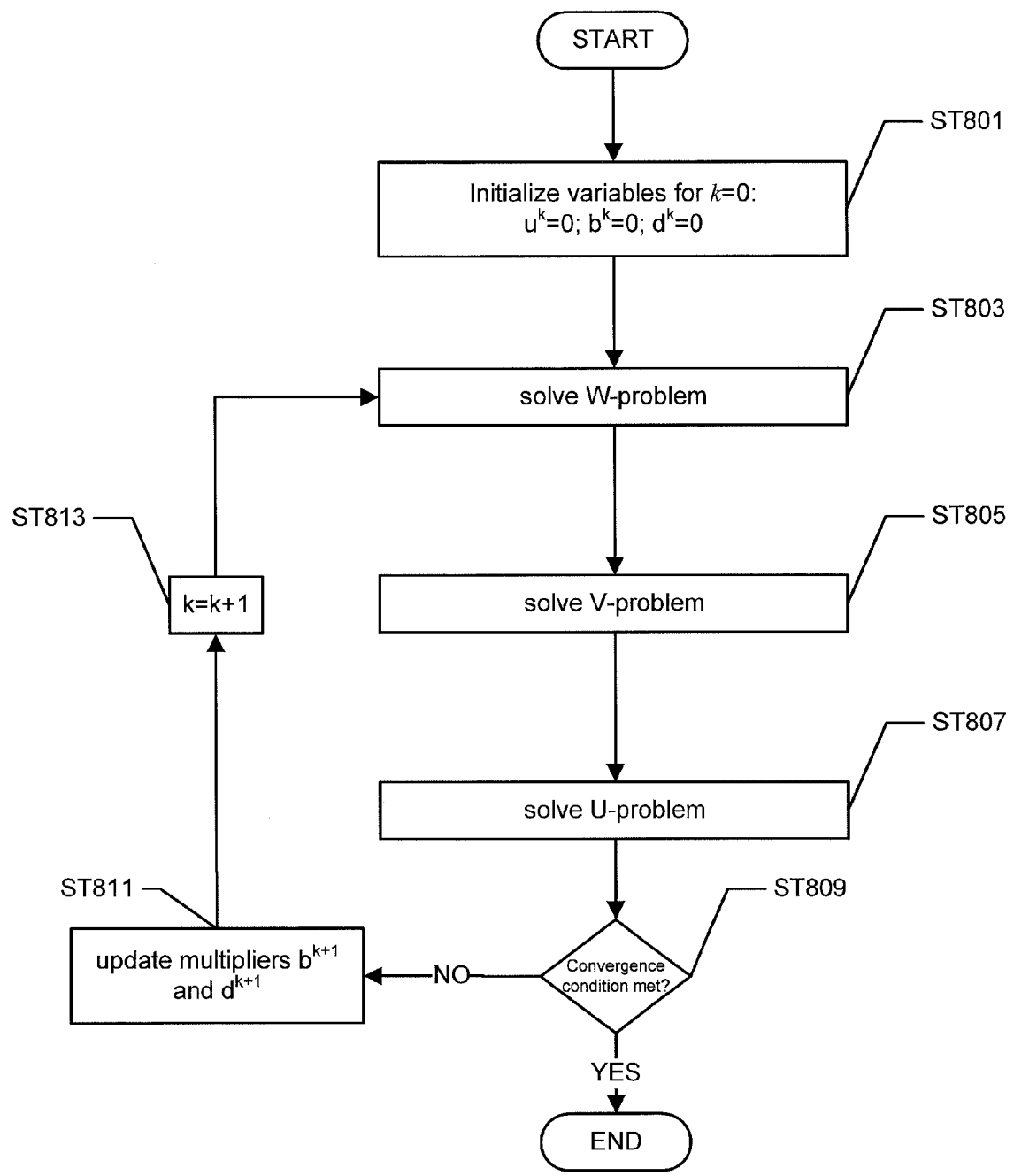
FIG. 8 shows a method of obtaining video frame data by iteratively solving the alternating direction augmented Lagrangian, an iterative method in accordance with one or more embodiments.

FIG. 8 shows a flow chart for iteratively solving the augmented Lagrangian of Eq. (27) in accordance with one or more embodiments. In step 801, the variables are initialized for k=0, e.g., by setting all initial values to zero.

In step 803, the W-subproblem is solved. For example, in accordance with one or more embodiments, the W-subproblem may be stated as $$w^{k+1} \leftarrow \min_w \lambda \|w\|_p + \frac{\beta}{2} \|w - Du^k - b^k\|_2^2 \qquad (28)$$

In accordance with one or more embodiments, the W-subproblem may be solved numerically using gradient projection. For example, for p=1, $$w^{k+1} = S_1\left(Du^k + b^k, \frac{\lambda}{\beta}\right) \qquad (28a)$$

where $$S_1\left(x, \frac{\lambda}{\beta}\right) = \max\left\{|x| - \frac{\lambda}{\beta}, 0\right\} \square \text{sgn}(x) \qquad (28b)$$

and $\square$ denotes the component-wise product. Likewise, for p=2, $$w^{k+1} = S_2\left(Du^k + b^k, \frac{\lambda}{\beta}\right) \qquad (28c)$$

where $$S_2\left(x, \frac{\lambda}{\beta}\right) = \max\left\{\|x\|_2 - \frac{\lambda}{\beta}, 0\right\} \square \frac{x}{\|x\|_2} \qquad (28d)$$

and $\square$ denotes the component-wise product. Other techniques may also be used to solve the W-problem without departing from the scope of the present disclosure.

In step 805, the V-subproblem is solved. For example, in accordance with one or more embodiments, the V-subproblem may be stated as $$v^{k+1} \leftarrow \min_v \mu \|v\|_1 + \frac{\beta}{2} \|v - \Psi(u^k) - d^k\|_2^2 \qquad (29)$$

In accordance with one or more embodiments, the V-subproblem may be solved using gradient projection. For example, $$v^{k+1} = S_1\left(\Psi(u^k) + d^k, \frac{\mu}{\beta}\right) \qquad (29a)$$

With $S_1$ as defined above. Other techniques may also be used to solve the V-problem without departing from the scope of the present disclosure.

In step 807, the U-subproblem is solved. For example, in accordance with one or more embodiments, the U-subproblem may be stated as $$u^{k+1} \leftarrow \min_u H(u, y, q) + \|w^{k+1} - Du - b^k\|_2^2 + \|v^{k+1} - \Psi(u) - d^k\|_2^2 \qquad (30)$$

In accordance with one or more embodiments, the U-subproblem may be solved using preconditioned conjugate gradient descent, Newton's method, or any other appropriate method.

In step 809, a convergence criteria is tested to see if convergence has occurred. For example, one possible convergence criteria may be stated as follows:

$$\|u^{k+1} - u^k\|/\max(u^k, 1) \le tol \qquad (30a)$$

Where tol is a user defined small constant, e.g., $10^{-6}$.

If convergence has not occurred, the method proceeds to step 811 and Lagrange multipliers b and d are updated, e.g., using a Bregman update, according to the following rules:

$$b^{k+1} \leftarrow b^k - \gamma(w^{k+1} - Du^{k+1}) \qquad (31)$$

$$d^{k+1} \leftarrow d^k - \gamma(v^{k+1} - \Psi(u^{k+1})) \qquad (32)$$

In step 813, k is iterated according to k=k+1 and then the method returns to step 803. The method thus continues to iterate consecutively through the W, V, and U, subproblems until the convergence criteria is met. When the convergence criteria is met, the method ends, and U is output as the frames of reconstructed high-resolution video.

Reconstruction of Video on Motion Manifold Assuming Joint Structured Sparsity

In accordance with one or more embodiments, the full resolution video frames are reconstructed from the compressive sensed video frames utilizing an assumption of joint structured sparsity on the motion manifold. Furthermore, in accordance with one or more embodiments, a linear dynamical systems (LDS) approach is used to model the motion manifold. In what follows, a general description of LDS is provided in reference to FIG. 9 as an aid to understanding one or more embodiments of the invention.

According to the LDS model, the original video frame at time t, denoted as $y_t$, may be represented as a linear combination of states $x_t$, corrupted by noise. In other words, LDS assumes the following $$y_t = Cx_t$$

Furthermore, in accordance with one or more embodiments, the states $x_t$ may evolve according to a first order Markov process corrupted by process noise. In the case where the dimensionality d of the hidden states $x_t$ is much less than the dimensionality of the original frames n, or d<<n, the use of LDS is an effective way to reduce the high-dimensional (n×1 dimensional) video cube Y into a low-dimensional (d×1) representation based on the state sequence X.

Figure 9A:
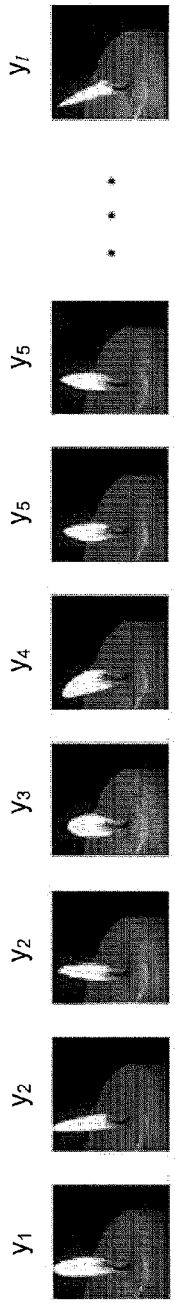
FIGS. 9A-9C show an example of a linear dynamical system for a sample video from the dyntex video database.
Figure 9B:
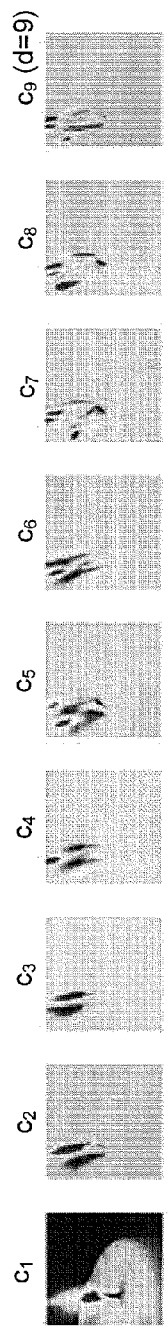
Figure 9C:
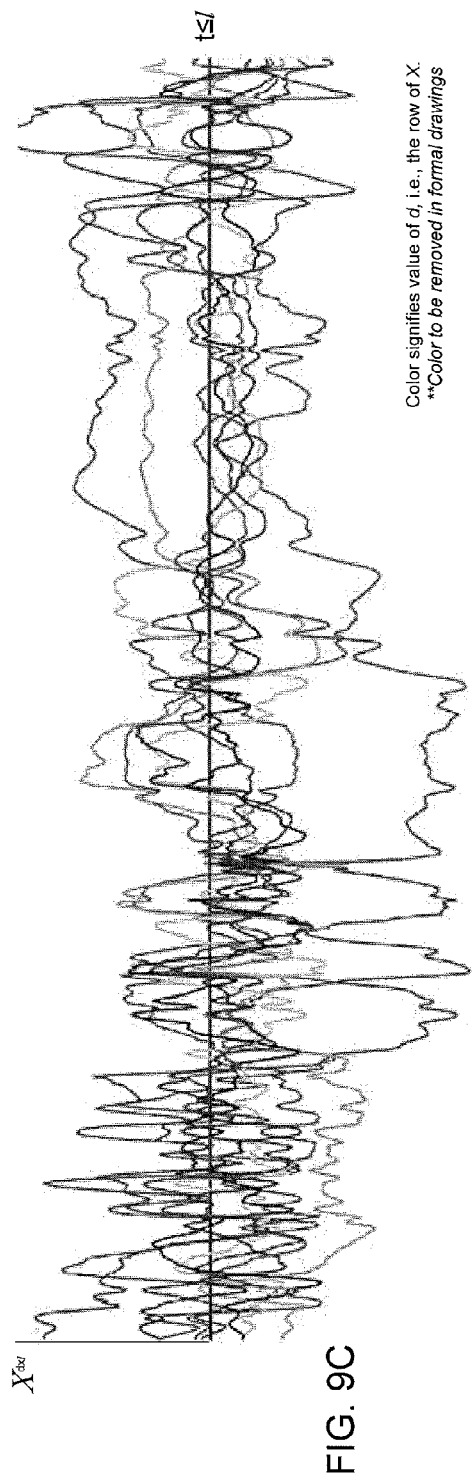

FIGS. 9A-9C show an example of an LDS for a sample video from the dyntex video database. FIG. 9A shows a sequence of the original (full-resolution) video frames $y_t$, where t=1, 2, ..., l; FIG. 9B shows the columns (where, d=9 for this particular LDS) of the observation matrix C; and FIG. 9C shows the state sequence $x_t$.

In view of the above general description, the method in accordance with one or more embodiments of the invention works in a manner that is, loosely speaking, the inverse of the LDS process described above. That is to say rather than using the full frame video cube Y to determine the LDS characterized by C and X, CS based on LDS seeks to acquire enough sparsely sampled data frames to numerically generate C and X, and then use the generated C and X to numerically reconstruct the full frame video cube Y. The LDS of CS in accordance with one or more embodiments may be written (for CS in Fourier space) as $$z_t = \Phi_t F C x_t + \omega_t, \omega_t \sim N(0,Q) \quad (35)$$

$$x_{t+1} = A x_t + v_t, v_t \sim N(0,R) \quad (36)$$

where $z_t$ are the compressed sensed frames, and $Cx_t$ are the full resolution frames that are desired to be reconstructed, F is the multi-dimensional Fourier transform in the image domain $\Omega$, and $\Phi_t \in \mathbb{R}^{m \times n}$ is the time dependent compressive measurement matrix that determines precisely where in k-space the sampling is done during the image acquisition process. Thus, with the problem formulated as shown in Eqs. (35)-(36), the full resolution video frames may reconstructed using $$y_t = Cx_t \quad (37)$$

In accordance with one or more embodiments, a two component sampling strategy may be employed that splits the compressive measurement matrix $\Phi_t$ into two components, a time invariant component $\bar{\Phi}$ and a time-variant component $\tilde{\Phi}_t$. Accordingly, the compressive sensed frames may be written as $$z_t = \begin{pmatrix} \bar{z}_t \\ \tilde{z}_t \end{pmatrix} = \begin{pmatrix} \bar{\Phi} F \\ \tilde{\Phi}_t F \end{pmatrix} y_t \quad (38)$$

where $\bar{\Phi}$ is the time-invariant component that is designed to facilitate estimation for the state sequence and $\tilde{\Phi}_t$ is the time-variant component to allow innovation during the acquisition process, due to the ephemeral nature of videos, i.e., the fact that the scene changes during the measurement process and additional measurements of an event may not be made after the event occurs.

In accordance with one or more embodiments, the time-invariant component $\bar{\Phi}$ satisfies the observability condition for LDS. In the Fourier domain, the low frequency contents of the video frames change marginally, while the high-frequency contents change more drastically from frame to frame. Thus, in accordance with one or more embodiments, the low frequency domain may be sampled more densely. Furthermore, in accordance with one or more embodiments, the time-variant component $\tilde{\Phi}_t$ is designed to satisfy the incoherence assumptions for compressive sensing, promoting randomness of the Fourier samples in the temporal domain. For example, within each frame, the Fourier space may be sampled according to the theoretical results obtained by Krahmer et al. "Beyond incoherence: stable and robust sampling strategies" Tech. Rep., arXiV 1210.2380v2 (2012). In one example, $\tilde{\Phi}_t$ is designed to sample k-space randomly, according to a particular probability distribution function P(k). Furthermore, in accordance with one or more embodiments, the time dependence may be created by generating a new set of points according to the same or different probability distribution function at each point in time. For the time invariant component $\bar{\Phi}$, the k-space sampling strategy is also determined using a probability distribution but the set of random points is generated only once and used for all times. Examples of probability distributions that may be used for both the time-invariant and time-variant components include: uniform distribution (probability of sampling is uniform in k-space, e.g., $P(k_1, k_2) = C$, where C is a constant), distance distribution (probability of sampling falls off as the inverse of the squared distance to the k-space center, e.g., $P(k_1, k_2) \propto (k_1^2 + k_2^2)^{-1}$), as the inverse squared hyperbolic distribution (probability of sampling falls off as a hyperbolic function in k-space $P(k_1, k_2) \propto (k_1^2 + k_2^2 + 1)^{-1}$). The above sampling distributions are disclosed merely for the sake of example and thus any suitable sampling distribution may be used without departing from the scope of the present disclosure.

Figure 10:
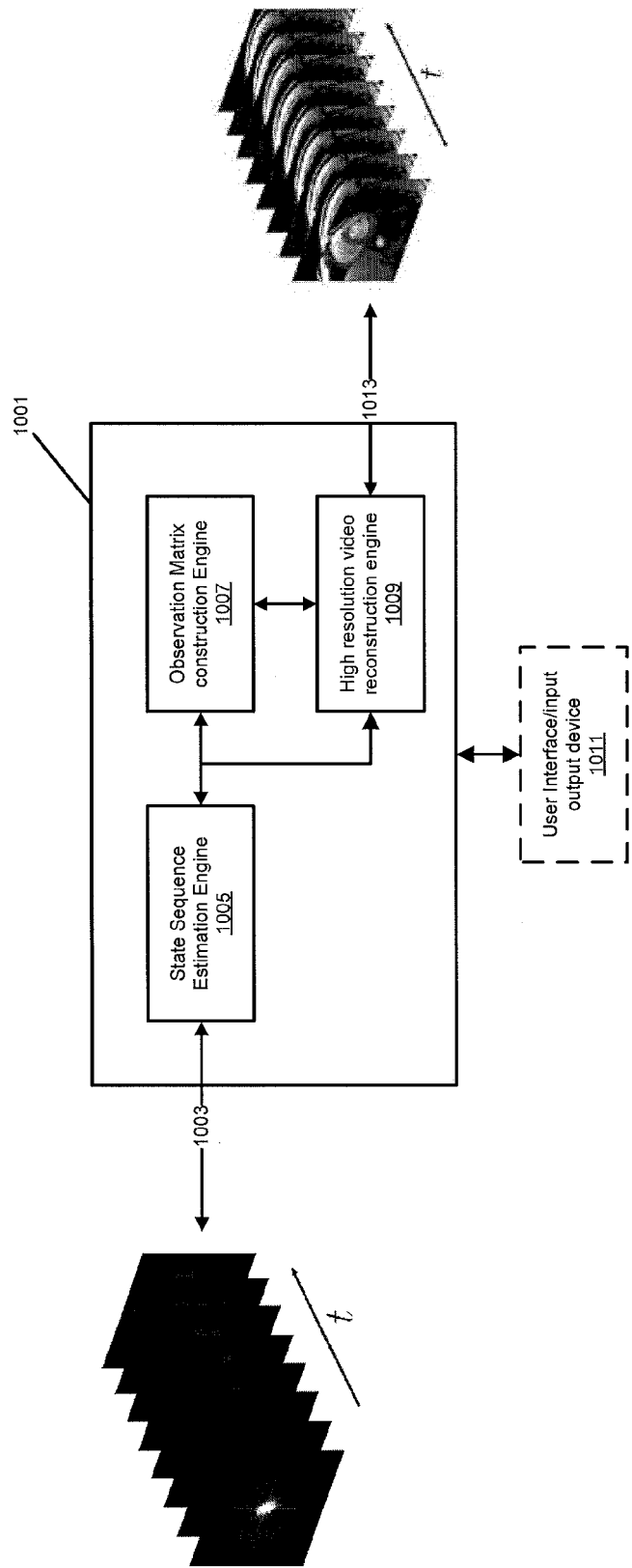
FIG. 10 shows a video processing unit in accordance with one or more embodiments.

FIG. 10 shows a video processing unit in accordance with one or more embodiments of the invention. More specifically, FIG. 10 shows a video processing unit for dynamic image reconstruction that employs joint structured sparsity on a motion manifold using LDS, as introduced above. Such a processing unit may be employed within a compressive sensing system for dynamic imaging in accordance with one or more embodiments, e.g., as shown and described above in reference to FIG. 2. One or more embodiments of the video processing unit and its components may be implemented using hardware, software, or any combination thereof. If implemented in software, the software may be stored on a computer readable medium, e.g., memory 209 of video acquisition system 203, or any other suitable memory operably connected to the video processing unit 1001. Furthermore, the software may be executed by the one or more processors of the video acquisition system, e.g., processors 217 shown in FIG. 2, to perform the video reconstruction method in accordance with one or more embodiments.

The video processing unit 1001 includes a state sequence estimation engine 1005, an observation matrix reconstruction engine 1007, a high-resolution video reconstruction engine 1009, and an optional user interface/input device 1011. In accordance with one or more embodiments, state sequence estimation engine 1005 receives compressive sensed video frame data 1003, e.g., the frame data acquired by the signal interface 205 described above in reference to FIG. 2. In accordance with one or more embodiments, the compressive sensed video frame data 1003 may be in the form of a compressive sensed video data cube, as shown. In accordance with one or more embodiments, the compressive sensed video frame data 1003 may include both the frame data from the compressive measurement, referred to herein as either y(t) or z(t), and the measurement matrix, referred to herein as $\Phi$. In accordance with one or more embodiments, state sequence estimation engine 1005 may compute the state sequence X associated with a linear dynamical system (LDS) model of the compressive sensed video frame data. This process is described in more detail below in reference to FIGS. 11-12. The state sequence X is then output to both the observation matrix reconstruction engine 1007 and the high resolution video reconstruction engine 1009. In accordance with one or more embodiments, the observation matrix construction engine 1007 may construct an observation matrix C associated with the LDS of compressive sensed video data using both the state sequence X and the compressive sensed video data cube Z. Generally speaking, in accordance with one or more embodiments, the observation matrix construction engine may determine the observation matrix C by solving an optimization problem employing joint structured sparsity on the motion manifold. In accordance with one or more embodiments, the optimization problem may be solved using ADAL. The observation matrix construction process is described in more detail below in reference to FIGS. 11-12. Observation matrix construction engine 1007 is configured to output the observation matrix to the high resolution video reconstruction engine 1009. The high resolution video reconstruction engine 1009 is configured to receive both the state sequence X and the observation matrix C and compute the reconstructed frames Y of high resolution video 1013 from the state sequence X and observation matrix C. In accordance with one or more embodiments, the process executed by the high resolution video reconstruction engine 1009 is described in more detail below in reference to FIGS. 11-12. In accordance with one or more embodiments, the frames of high resolution video $y_t$ may be output for display. In accordance with one or more embodiments, the frames of the high resolution video $y_t$ form a video data cube Y.

Figure 11:
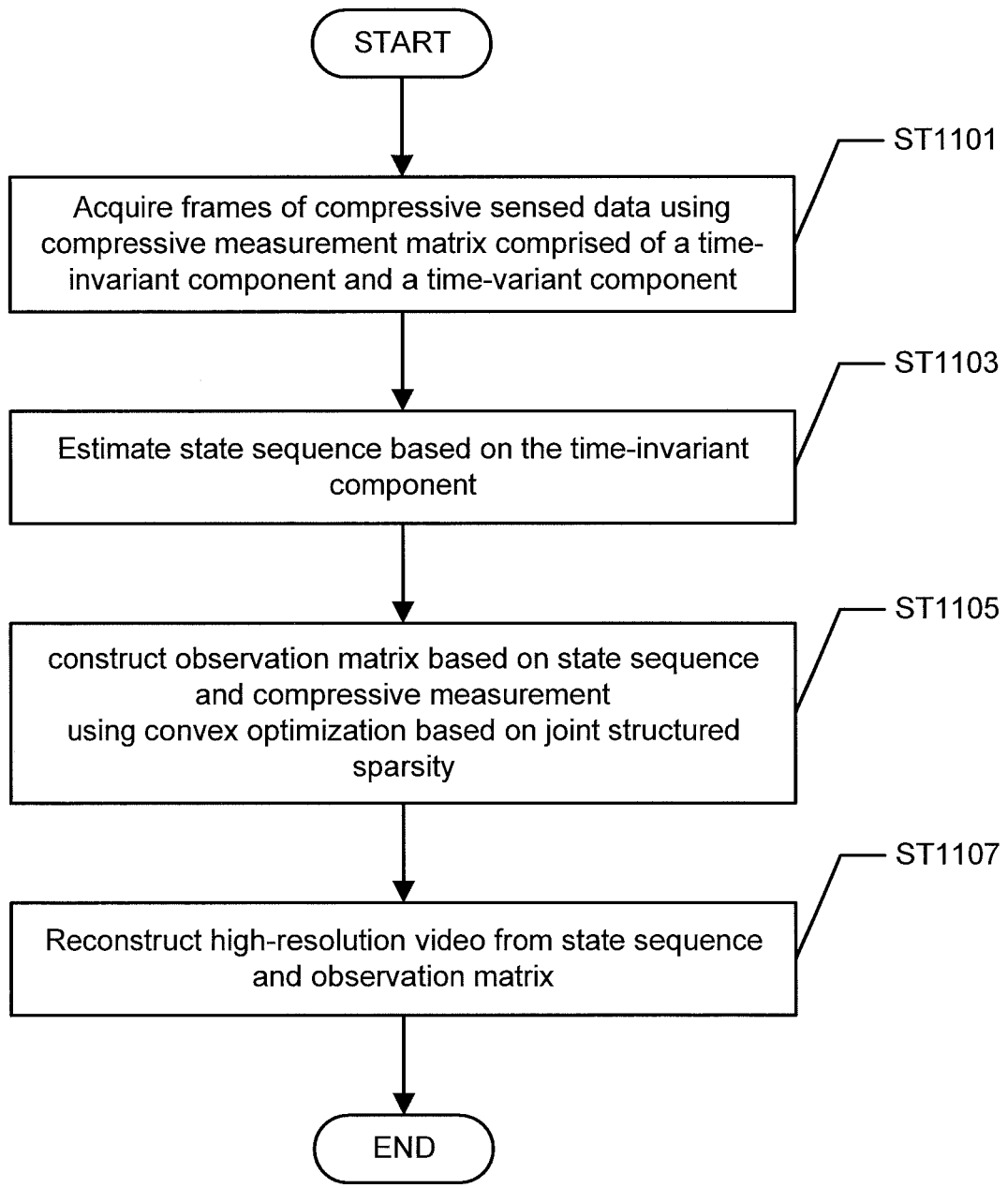
FIG. 11 shows a method of video compressive sensing for dynamic imaging that uses linear dynamical systems to model the motion manifold and employs joint structured sparsity on the motion manifold for video reconstruction.

FIG. 11 shows a flow chart describing a method in accordance with one or more embodiments of the invention. More specifically, FIG. 11 shows a method of video compressive sensing for dynamic imaging that uses linear dynamical systems to model the motion manifold and employs joint structured sparsity on the motion manifold for video reconstruction. Furthermore, in accordance with one or more embodiments, the method may employ ADAL.

In step 1101, frames of compressive sensed data are acquired using a compressive measurement matrix having a time-invariant component and a time-variant component. Any suitable measurement matrix may be used, e.g., as described above in reference to Eq. (38). Furthermore, the compressive sensed data may be acquired using software and/or hardware that is identical or similar to that described above in reference to FIG. 2.

In step 1103, the state sequence X is estimated based on the time invariant component of the frames of compressive sensed data. For example, in accordance with one or more embodiments, the time invariant component of the compressive sensed frames, denoted by $\bar{z}_t$ is given by $$\bar{z}_t = \Phi F C x_t + \omega_t, \ \omega_t \sim N(0,Q) \tag{39}$$

$$x_{t+1} = A x_t + v_t, \ v_t \sim N(0,R) \tag{40}$$

In accordance with one or more embodiments, the state sequence may be obtained by performing a singular value decomposition (SVD) on the block-Hankel matrix $H_d(\bar{z})$ formed using the set of measured $\bar{z}_t$, which may be written as $$H_d(\bar{z}) = \begin{pmatrix} \bar{z}_1 & \bar{z}_2 & \cdots & \bar{z}_{l-d+1} \\ \bar{z}_2 & \bar{z}_3 & \cdots & \bar{z}_{l-d+2} \\ \vdots & \vdots & \ddots & \vdots \\ \bar{z}_d & \bar{z}_{d+1} & \cdots & \bar{z}_l \end{pmatrix} \tag{41}$$

where d is a user defined parameter that not only defines the size of the Hankel matrix but also determines how many eigensystems to take from the SVD, as discussed below. However, in accordance with one or more embodiments, the index d may be decoupled from the number of eigensystems eventually used. More specifically, the SVD of $H_d(\bar{z})$ results in the matrix decomposition of $H_d(\bar{z}) = U \Sigma V^T$. Taking the first d eigensystems from the decomposition yields the sub-matrices $U_d$, $\Sigma_d$, $V_d$. In accordance with one or more embodiments, the number of eigensystems used for estimating the state sequence may be chosen by the user to ensure an accurate representation, e.g., the eigensystems having the m largest eigenvalues may be chosen, independent of the original size of the Hankel matrix. In other examples, for simplicity, the number of eigensystems chosen and the size of the Hankel matrix may be both determined by the index d. The state sequence estimate $\hat{X}$ is then obtained from the sub-matrices by the following formula $$\hat{X} = \Sigma_d V_d^T \tag{42}$$

It should be noted that the estimated state sequence $\hat{X}$ obtained by factorizing the block-Hankel matrix is not unique, but defined only up to a linear transformation. In other words, there is no unique solution for the state sequence estimation. In accordance with one or more embodiments, this ambiguity is resolved by a joint sparsity assumption, as described below in reference to Eq. (43). In addition, while SVD is used to identify the subspace in this example, any classical subspace identification method may be employed without departing from the scope of the present disclosure, e.g., principal component analysis (PCA), unweighted PCA, canonical variate analysis (CVA), numerical algorithms for subspace identification (N4SID), and multivariate output error state space (MOESP), or the like. Furthermore, one of ordinary skill will appreciate that other less computationally intensive methods may also be employed without departing from the scope of the present disclosure. In accordance with one or more embodiments, an example of a less computationally intensive method for sequence identification is described in more detail below in reference to FIG. 14.

In step 1105, the observation matrix C is constructed from the estimated state sequence $\hat{X}$ and the frames of compressive sensed data $\bar{z}_t$ obtained from the time independent sensing matrix $\bar{\Phi}$ by solving a convex optimization problem based on joint structured sparsity. Let $c_1, c_2, \ldots, c_n$ be the rows of the observation matrix C, and let $c_{(1)}, c_{(2)}, \ldots, c_{(d)}$ be the columns of the observation matrix C. Then the construction problem takes the following form:

$$\min_C \alpha \sum_{j=1}^d TV(c_{(j)}) + \beta \sum_{j=1}^d \|\Psi(c_{(j)})\|_1 + \gamma \sum_{i=1}^n \|c_i\|_2 + \sum_{t=1}^t \frac{1}{2}\|z_t - \Phi_t FC\hat{x}_t\|_2^2 \quad (43)$$

The first two regularization terms concern the structured sparsity within each column of the observation matrix. More precisely, each column of the observation matrix $c_{(j)}$ is piecewise smooth on the motion manifold, thus this variational property is modeled via total variation (TV), and $c_{(j)}$ is demanded to be sparse under wavelet transform $\psi(\bullet)$. The third term is the joint sparsity regularization, $\|C\|_{2,1} := \sum_{i=1}^n \|c_i\|_2$, which forces all columns of the observation matrix to share the same support. In accordance with one or more embodiments, the joint sparsity is advantageous to the success of the construction, due to the ambiguity introduced by the non-uniqueness for state sequence estimation (LDS determines X only up to a linear transformation).

It can be seen from inspection of Eq. (43) that the optimization problem has several terms whose energies are coupled. Moreover, there is no closed-form for computing the adjoint operator for the TV term and the joint sparsity term also makes the problem relatively complicated. However, without the TV term, the optimization problem can be solved using several off-the-shell algorithms, such as spectral projected gradient method (SPGL1), accelerated gradient method (SLEP), block-coordinate descent algorithm, and SpaRSA. However, none of these off the shelf algorithms exploits the structure of the Fourier operator, as is done in accordance with one or more embodiments of the invention. In accordance with one or more embodiments, solving the optimization problem using ADAL facilitates the exploitation of the structure of the Fourier operator. In what follows, the optimization problem including a TV term is solved. However, the optimization problem stated without the TV term may also be solved in accordance with one or more embodiments without departing from the scope of the present disclosure.

Returning to FIG. 11, in step 1105, the observation matrix C is obtained using ADAL in accordance with one or more embodiments. ADAL proceeds as follows: First, additional variables are introduced to split the energy between different regularization terms, which results in the following constrained optimization, $$\min_{W,V,U,C} \alpha \sum_{j=1}^d \|w_{(j)}\|_p + \beta \sum_{j=1}^d \|v_{(j)}\|_1 + \gamma \sum_{i=1}^n \|u_i\|_2 + \sum_{t=1}^t \frac{1}{2}\|z_t - \Phi_t FC\hat{x}_t\|_2^2 \quad (44)$$

s.t. $w_{(j)} = \nabla(c_{(j)})$  $v_{(j)} = \Psi(c_{(j)})$  $u_t = c_i\beta$ where $\nabla$ is the gradient operator, p=1 for anisotropic TV; and p=2 for isotropic TV. The new variables are W, V, and U, where $W \in R^{n \times d}$, $V \in R^{r \times d}$, and $U \in R^{n \times d}$ to denote the matrix form. The respective column vectors are denoted by $w_{(j)}$, $v_{(j)}$, indexed by $j=1, 2, \ldots, d$, and $u_i$ is a row vector indexed by $i=1, 2, \ldots, n$.

In accordance with one or more embodiments, this constrained optimization problem may then be re-formulated into an unconstrained optimization problem using the augmented Lagrangian method, $$\min_{W,V,U,C} \alpha \sum_{j=1}^d \|w_{(j)}\|_p + \beta \sum_{j=1}^d \|v_{(j)}\|_1 + \gamma \sum_{i=1}^n \|u_i\|_2 + \sum_{t=1}^t \frac{1}{2}\|z_t - \Phi_t FC\hat{x}_t\|_2^2 + \frac{\alpha\mu}{2} \sum_{j=1}^d \|w_{(j)} - \nabla c_{(j)} - e_{(j)}\|_2^2 + \frac{\beta\mu}{2} \sum_{j=1}^d \|v_{(j)} - \Psi c_{(j)} - f_{(j)}\|_2^2 + \frac{\gamma\mu}{2} \sum_{i=1}^n \|u_i - c_i - g_i\|_2^2 \quad (45)$$

where $e_{(j)}$, $f_{(j)}$, and $g_i$ are the Lagrange multipliers. Thus, in step 1105, the observation matrix C is obtained by solving the above equation by alternating directions among W, V, U, and C as described in more detail in reference to FIG. 12 below.

In step 1107, the LDS, i.e., the constructed X and C obtained in steps 1103 and 1105, respectively are then used to reconstruct the high-resolution video frames $y_t$ using the relation $$y_t = C\hat{x}_t \quad (46)$$

Figure 12:
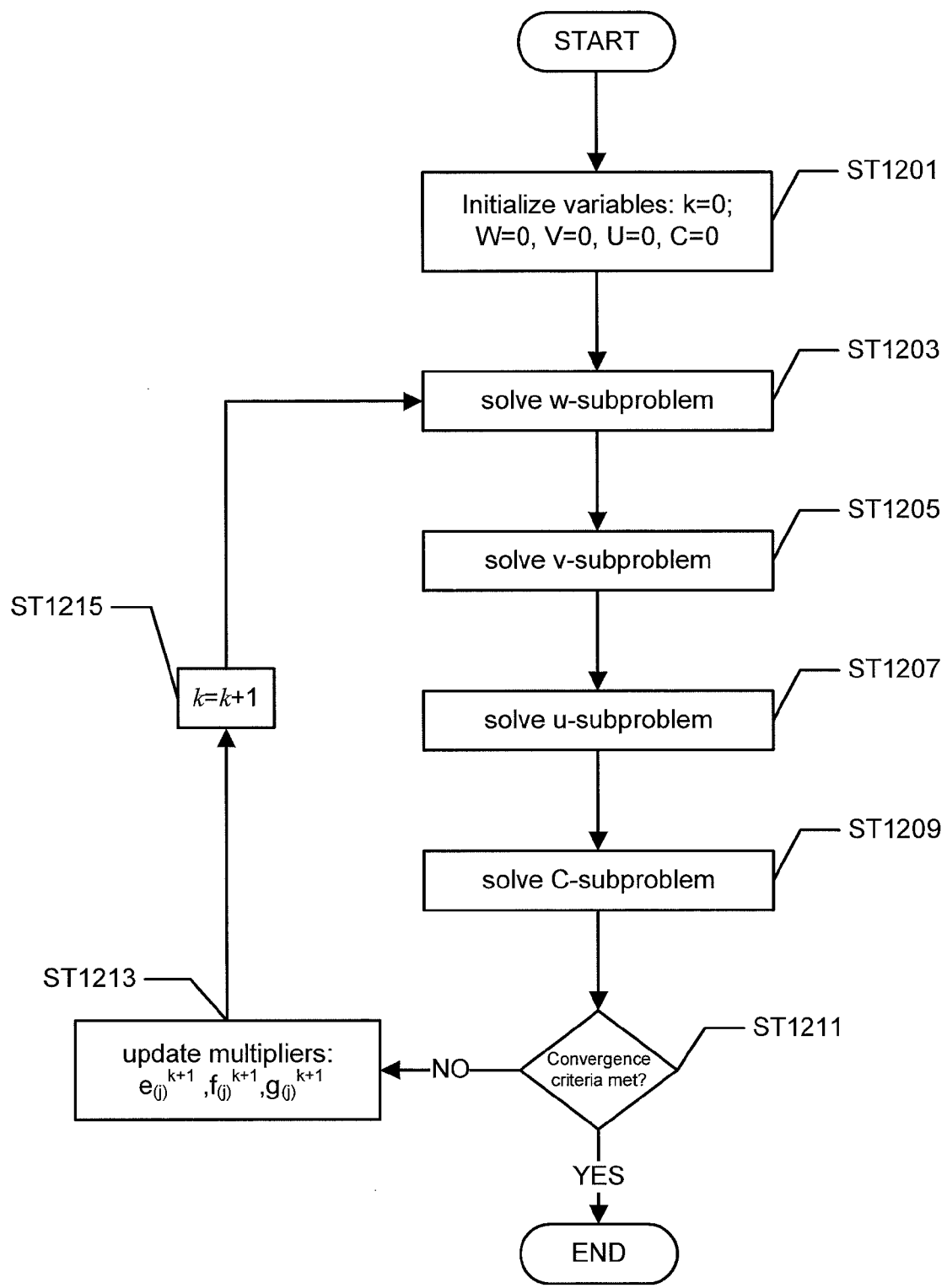
FIG. 12 shows a method of obtaining an observation matrix by iteratively solving the alternating direction augmented Lagrangian, an iterative method in accordance with one or more embodiments.

FIG. 12 shows the sub-steps involved to construct the observation matrix C from the estimated state sequence $\hat{X}$ and the frames of compressive sensed data, i.e., the sub-steps involved in step 1105 above. In accordance with one or more embodiments, FIG. 12 shows the steps of the ADAL. In step 1201, the variables are initialized. For example, all initial values may be set to zero.

In step 1203, the W-subproblem is solved. In accordance with one or more embodiments, the W-subproblem may be stated as follows:

$$W^{k+1} \leftarrow \min_W \alpha \sum_{j=1}^d \|w_{(j)}\|_p + \frac{\alpha\mu}{2} \sum_{j=1}^d \|w_{(j)} - \nabla c_{(j)}^k - e_{(j)}^k\|_2^2 \quad (47)$$

In accordance with one or more embodiments, the W-subproblem may be solved using the gradient projection method, where the projection operator is defined by the shrinkage operator.

In step 1205, the V-subproblem is solved. In accordance with one or more embodiments, the V-subproblem may be stated as follows:

$$V^{k+1} \leftarrow \min_V \beta \sum_{j=1}^d \|v_{(j)}\|_1 + \frac{\beta\mu}{2} \sum_{j=1}^d \|v_{(j)} - \Psi c_{(j)}^k - f_{(j)}^k\|_2^2 \quad (48)$$

In accordance with one or more embodiments, the V-subproblem may be solved using the gradient projection method, where the projection operator is defined by the shrinkage operator.

In step 1207, the U-subproblem is solved. In accordance with one or more embodiments, the U-subproblem may be stated as follows:

$$U^{k+1} \leftarrow \min_{U} \gamma \sum_{i=1}^{n} \|u_{(i)}\|_2 + \frac{\gamma\mu}{2} \sum_{i=1}^{n} \|u_i - c_i^k - g_i^k\|_2^2 \quad (49)$$

In accordance with one or more embodiments, the U-subproblem may be solved using the gradient projection method, where the projection operator is defined by the shrinkage operator.

In step 1209, the C-subproblem is solved. In accordance with one or more embodiments, the U-subproblem may be stated as follows:

$$C^{k+1} \leftarrow \min_{C} \frac{\alpha\mu}{2} \sum_{j=1}^{d} \|w_{(j)} - \nabla c_{(j)} - e_{(j)}\|_2^2 + \quad (50)$$

$$\frac{\beta\mu}{2} \sum_{j=1}^{d} \|v_{(j)} - \Psi c_{(j)} - f_{(j)}\|_2^2 +$$

$$\frac{\gamma\mu}{2} \sum_{i=1}^{n} \|u_i^{k+1} - c_i - g_i^k\|_2^2 + \sum_{t=1}^{l} \frac{1}{2}\|z_t - \Phi_t F C \hat{x}_t\|_2^2$$

In accordance with one or more embodiments, the linearity property of the Fourier transform may be exploited to rewrite the $$\sum_{t=1}^{l} \frac{1}{2}\|z_t - \Phi_t F C \hat{x}_t\|_2^2$$

term of the C-subproblem as follows, so that all terms of the C-subproblem operate in the column space of the observation matrix C:

$$\sum_{t=1}^{l} \frac{1}{2}\left\|z_t - \Phi_t \sum_{j=1}^{d} \hat{x}_{t,j} F(cc_{(j)})\right\|_2^2 \quad (51)$$

and further noting that the third term $$\sum_{i=1}^{n} \|u_i^{k+1} - c_i - g_i^k\|_2^2 = \sum_{i=1}^{n} \|u_{(j)}^{k+1} - c_{(j)} - g_{(j)}^k\|_2^2 \quad (52)$$

Allows the new form of the objective function to be written as $$C^{k+1} \leftarrow \min_{C} \frac{\alpha\mu}{2} \sum_{j=1}^{d} \|w_{(j)} - \nabla c_{(j)} - e_{(j)}\|_2^2 + \quad (53)$$

$$\frac{\beta\mu}{2} \sum_{j=1}^{d} \|v_{(j)}^{k+1} - \Psi c_{(j)} - f_{(j)}^k\|_2^2 + \sum_{i=1}^{n} \|u_{(j)}^{k+1} - c_{(j)} - g_{(j)}^k\|_2^2 +$$

$$\sum_{t=1}^{l} \frac{1}{2}\left\|z_t - \Phi_t \sum_{j=1}^{d} \hat{x}_{t,j} F(cc_{(j)})\right\|_2^2$$

In accordance with one or more embodiments, the C-subproblem may be solved using the spectral method in a manner that is similar to that laid out below for the case of no TV term where $$L = \alpha\mu D^T D + \beta\mu I + \gamma\mu I + \Sigma \ldots \quad (53a)$$

and $$R = \alpha\mu D(w_{(j)}^{k+1} - e_j^k) + \beta\Psi(v_{(j)}^{k+1} - f_{(j)}^k) + \gamma\mu(u_{(j)}^{k+1} - g_{(j)}^k) + \ldots \quad (53b)$$

In step 1211, a convergence criteria is tested to see if convergence has occurred. For example, one possible form for the convergence criteria is $$\frac{\|C^{k+1} - C^k\|}{\max(\|C^k\|, 1\|)} \leq tol$$

Where tol is a small user defined parameter, e.g., $10^{-6}$.

If the convergence criteria is not met, the Lagrange multipliers e, f, and g are updated according to the following rules:

$$e_{(j)}^{k+1} \leftarrow e_{(j)}^k - \delta(w_{(j)}^{k+1} - \nabla(c_{(j)}^{k+1}))$$

$$f_{(j)}^{k+1} \leftarrow f_{(j)}^k - \delta(v_{(j)}^{k+1} - \Psi(c_{(j)}^{k+1}))$$

$$g_i^{k+1} \leftarrow g_i^k - \delta(u_i^{k+1} - c_i^{k+1}) \quad (54)$$

In step 1215, k is iterated according to k=k+1 and then the method returns to step 1203. The method thus continues to iterate consecutively through the W, V, U, and C, subproblems until the convergence criteria is met. When the convergence criteria is met, the method ends, and C is output as the constructed observation matrix.

FIG. 13 shows an example of the original and reconstructed video frames that were reconstructed according to the method described in FIGS. 11-12, showing the remarkable accuracy of the method.

As alluded to above, the optimization problem used to find C may be solved without the use of the TV term, in which case it takes the form of:

$$\min_{C} \beta \sum_{j=1}^{d} \|\Psi(c_{(j)})\|_1 + \gamma \sum_{i=1}^{n} \|c_i\|_2 + \sum_{t=1}^{l} \frac{1}{2}\|z_t - \Phi_t F C \hat{x}_t\|_2^2 \quad (55)$$

In this case, the method for solving Eq. (55) using ADAL proceeds nearly identically to that described above in reference to FIG. 12 except that the W-subproblem is no longer present and that the C-subproblem is simplified to the following form:

$$C^{k+1} \leftarrow \min_{C} \frac{\beta\mu}{2} \sum_{j=1}^{d} \|v_{(j)}^{k+1} - \Psi c_{(j)} - f_{(j)}^k\|_2^2 + \quad (56)$$

$$\frac{\gamma\mu}{2}\sum_{i=1}^{n}\|u_i^{k+1} - c_i - g_i^k\|_2^2 + \sum_{t=1}^{l}\frac{1}{2}\|z_t - \Phi_t FC\hat{x}_t\|_2^2$$

Furthermore, exploiting the linearity property of the Fourier transform in addition to the orthonormality property of both the Fourier transform operator ($F^T F = I$) and the wavelet transform ($\Psi^T\Psi = I$) reveals that each column of the C matrix may be obtained from the following closed form solution $$c_{(j)} = F^{-1}(FR/L) \tag{57}$$

where R is given by $$R = \beta\mu\Psi^T(v_j^{k+1} - f_j^k) + \gamma\mu(u_j^{k+1} - g_j^k) - \tag{58}$$
$$\sum_{t=1}^{l}\left(\sum_{j'\neq j} F^T\Phi_t^T\Phi_t F\hat{x}_{t,j}\hat{x}_{t,j'}c_{j'}\right) + \sum_{t=1}^{l} F^T\Phi_t^T z_t \hat{x}_{t,j}$$

and where L is given by $$L = \beta\mu I + \gamma\mu I + \sum_{t=1}^{l}\hat{x}_{t,j}^2 \Phi_t^T\Phi_t \tag{59}$$

Figure 14:
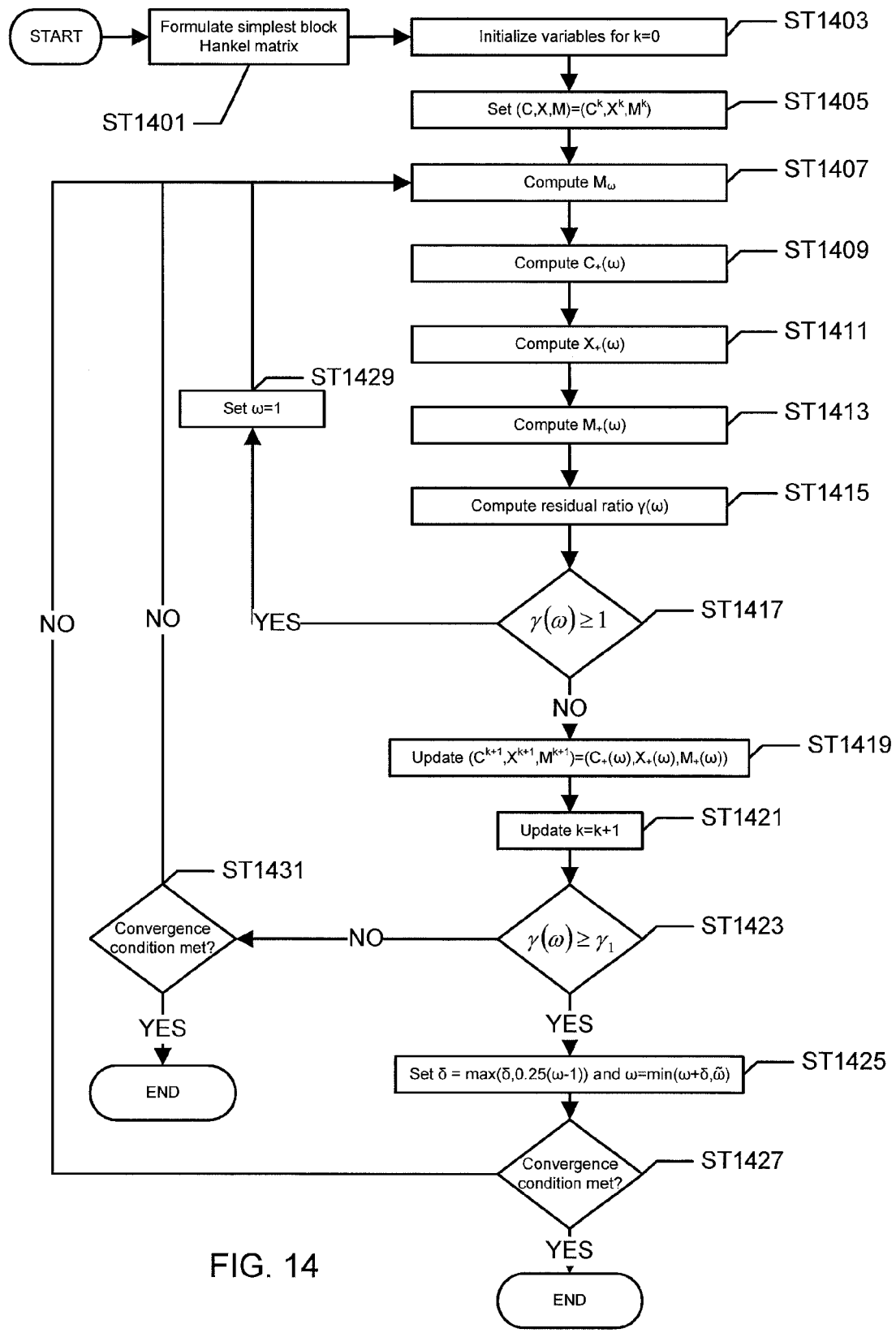
FIG. 14 shows a method of system identification in accordance with one or more embodiments.

FIG. 14 shows a method for system identification using a low rank Hankel matrix in accordance with one or more embodiments of the invention. In this example, the system identification problem is formulated as follows:

$$\hat{C}, \hat{X} = \underset{C,X}{\operatorname{argmin}}\|CX - M\|_F^2$$
$$\text{s.t.} \quad M = H_{1,1,l}(z) \operatorname{rank}(CX) = d$$

where a low rank-factorization is sought, resulting in spatial factor $C \in \mathbb{R}^{n \times d}$ and temporal factor $X \in \mathbb{R}^{d \times l}$. Such an approach is designed to alleviate the possible corruption of noise, which can increase the rank of the block Hankel matrix. FIG. 14 shows one example of a low rank factorization algorithm based on nonlinear successive over-relaxation, in accordance with one or more embodiments. This low rank factorization algorithm avoids the computational burden of SVD and obtains an estimation for both the observation matrix $\hat{C}$ and the state sequence $\hat{X}$.

In step 1401, the simplest black Hankel matrix is formulated:

$$H_{1,1,l}(z) = [\bar{z}_1, \bar{z}_s, \ldots, \bar{z}_{t_{\ldots}}, \bar{z}_l].$$

In step 1403, all variables are initialized. For example, $k=0$; $C^0 \in \mathbb{R}^{n \times d}$; $X^0 \in \mathbb{R}^{d \times l}$; $\omega=1$, $\square > 1$; $\delta > 0$; $\gamma_1 \in (0,1)$. In step 1405, $(C,X,M)$ is set to $(C^k, X^k, M^k)$.

In step 1407, $M_\omega$ is computed as follows:

$$M_\omega \leftarrow \omega M^k + (1-\omega)C^k X^k$$

In step 1409 $C_+(\omega)$ is computed as follows:

$$C_+(\omega) \leftarrow M_\omega X^T (XX^T)^t$$

In step 1411, $X_+(\omega)$ is computed as follows:

$$X_+(\omega) \leftarrow (C_+(\omega)^T C_+(\omega))^t (C_+(\omega)^T M_\omega)$$

In step 1413, $M_+(\omega)$ is computed as follows:

$$M_+(\omega) \leftarrow H_{1,1,l}(z)$$

In step 1415, the residual ratio $\gamma(\omega)$ is computed as follows:

$$\gamma(\omega) \leftarrow \|M - C_+(\omega)X_+(\omega)\|_F / \|M - CX\|_F$$

In step 1417 the value of $\gamma(\omega)$ is tested to determine if $\gamma(\omega) \geq 1$. If yes, the method proceeds to step 1429, where $\omega$ is set to 1 and then the method returns to step 1407. If $\gamma(\omega) < 1$ then the method proceed so step 1419 where C,X and M are updated.

In step 1423, $\gamma(\omega)$ is tested against $\gamma_1$. If $\gamma(\omega) \geq \gamma_1$ then the method proceeds to step 1425 where $\delta$ is set to $\max(\delta, 0.25(\omega-1))$ and $\omega$ is set to $\min(\omega+\delta,\square)$. Then at step 1427, the convergence criteria are tested. If the convergence is detected, then the method ends. If the method has not converged then the method returns to step 1407.

Returning to step 1423, if $\gamma(\omega) < \gamma_1$ then the method proceeds to step 1431 where the convergence criteria are tested. If convergence is detected then the method ends, otherwise the method returns to step 1407.

Total Variation

The following section includes a general description of the total variation (TV) to aid in the understanding of the invention. Considering the space only TV for simplicity first, total variation of u, is equipped with the BV seminorm $$TV(u) := |u|_{BV(\Omega)} = \int_\Omega |\nabla u| dx \tag{60}$$

and the space of functions with bounded total variation is $$BV(\Omega) := \{u \in L^1(\Omega) | TV(u) < \infty\} \tag{61}$$

TV regularization may take the anisotropic form or isotropic form.

Anisotropic TV $$J(u) := \int_\Omega \|\nabla u\|_1 \, dx = \sum_{i \in \Omega} \|Du_i\|_1 \tag{62}$$

where $Du_i \in \square^d$ is the discrete gradient of x at index i, with $d \in \{2, 3\}$ and $i \in \Omega$.

If d=2 for instance, the TV becomes $$J(u) = \sum_{i \in \Omega} |D_{x1}u_i + D_{x2}u_i| \tag{63}$$

Similarly, with d=3 the TV becomes $$J(u) = \sum_{i \in \Omega} |D_{x1}u_i + D_{x2}u_i + D_{x3}u_i| \tag{64}$$

Isotropic TV $$J(u) := \int_\Omega \|\nabla u\|_2 \, dx = \sum_{i \in \Omega} \|Du_i\|_2 \tag{65}$$

If d=2, this is equivalent to $$J(u) = \sum_{i \in \Omega} \sqrt{(D_{x1}u_i)^2 + (D_{x2}u_i)^2} \tag{66}$$

Likewise, if d=3 the isotropic TV becomes $$J(u) = \sum_{i \in \Omega} \sqrt{(D_{x1}u_i)^2 + (D_{x2}u_i)^2 + (D_{x3}u_i)^2} \qquad (67)$$

The boundary conditions for u can be periodic or Neumann. In accordance with one or more embodiments, numerical method framework can deal with both boundary conditions. Depending on the type of wavelet employed, different optimization strategies may be coupled with u's preferred boundary condition for numerical efficiency. One or more embodiments of the invention deal with both types of TV regularization, and have different treatment for the projection operator.

When dealing with spatial temporal data as is the case for dynamical imaging, the definition of TV may be generalized as follows:

2D Space+Time

When $\Omega \subset \mathbb{R}^2$ is considered, both wavelet transform and TV regularization are functionals defined on $\Omega \times [0,T] \to \mathbb{R}$, resulting in a 3D regularization of the form $$J(u) = \int_0^T (\int_\Omega |\nabla u| dx)^s dt \qquad (68)$$

where $s \in [1,2]$. Note that when $s=1$, this is equivalent to TV in 3D, $$J(u) = \int_{\omega \times [0,T]} |\nabla_3 u| d\tilde{x} \qquad (69)$$

where $\nabla_3 := (\partial_{x_1}, \partial_{x_2}, \partial_t)$, and $\tilde{x} := (x_1, x_2, t) \in \Omega \cdot [0,T]$.

3D Space+Time

When $\Omega \subset \mathbb{R}^3$ is considered, a 4D wavelet transform in spatial and temporal domain is defined. There are several ways to define 4D regularization for the TV term on $\Omega \times [0, T] \to R$. Similarly to the 2D image sequence above $$J(u) = \int_0^T (\int_\omega |\nabla u| dx)_s dt \qquad (70)$$

where $s \in [1,2]$.

While the embodiments have been described with respect to a limited number of embodiments, those skilled in the art, having benefit of this disclosure, will appreciate that other embodiments may be devised which do not depart from the scope of the embodiments as disclosed herein. Accordingly, the scope of the embodiments should be limited only by the attached claims.

What is claimed is:

1. A compressive sensing system for dynamic video acquisition, comprising:
  a video signal interface comprising a compressive imager configured to acquire compressive sensed video frame data from an object, wherein the compressive sensed frame data is generated by sampling a signal associated with the object at rate below a Nyquist frequency of the signal;
  a video processing unit comprising a processor and memory,
  wherein the video processing unit is configured to receive the compressive sensed video frame data from the video signal interface,
  wherein the memory comprises computer readable instructions that when executed by the processor cause the processor to:
    generate a motion estimate from the compressive sensed video frame data;
    generate dynamical video frame data from the motion estimate and the compressive sensed video frame data;
    output the dynamical video frame data,
  wherein the motion estimate is based on, at least in part, a velocity field,
  wherein the velocity field is determined based on preview frames that are generated from a low frequency domain of a subset of the frames of the compressive sensed video frame data.

2. The compressive sensing system of claim 1, wherein the motion estimate is obtained by solving an optimization problem comprising a compressible optical flow constraint.

3. The compressive sensing system of claim 2, wherein the compressible optical flow constraint enforces the following condition:

$$\partial_t u + q \cdot \nabla u + u \nabla \cdot q = 0$$

where u represents a dynamical video frame at time t, and q(x) represents the velocity field.

4. The compressive sensing system of claim 1, wherein the compressive sensed video frame data comprises:
  a first frame that specifies a scene at a first time, wherein the scene at the first time comprises the object at a first location within the scene; and
  a second frame that specifies the scene at a second time, wherein the scene at the second time comprises the object at a second location within the scene,
  wherein the first location and the second location are different locations within the scene.

5. A method for dynamic video acquisition, comprising:
  obtaining frames of compressive sensed data for an object, wherein the compressive sensed data is generated by sampling a signal associated with the object at rate below a Nyquist frequency of the signal;
  generating motion estimates using the frames of compressive sensed data; and
  generating dynamical video frame data using the motion estimates and the frames of compressive sensed data by solving an optimization problem, the optimization problem comprising a wavelet transformation term and a total variation regularization term subject to a compressible optical flow constraint,
  wherein the motion estimates are based on, at least in part, a velocity field,
  wherein the velocity field is determined based on preview frames that are generated from a low frequency domain of a subset of the frames of the frames of compressive sensed data.

6. The method of claim 5, wherein the compressible optical flow constraint requires solving the optimization problem such that:

$$\partial_t u + q \cdot \nabla u + u \nabla \cdot q = 0$$

where u represents a decompressed dynamical video frame at time t, and q represents the velocity field that quantifies the motion estimate.

7. The method of claim 5, further comprising:
  generating preview frames from the frames of compressive sensed data using a multi-scale sensing matrix;
  wherein the motion estimate is generated using the preview frames.

8. A method for dynamic video acquisition, comprising:
  acquiring, by a compressive imager, frames of compressive sensed data, wherein the compressive sensed data is generated by sampling a signal associated with an object at rate below a Nyquist frequency of the signal;
  generating motion estimates using the acquired frames of compressive sensed data; and
  generating dynamical video frame data using the motion estimates and the frames of compressive sensed data by solving an optimization problem using an alternating direction augmented Lagrangian method, wherein the motion estimates are based on, at least in part, a velocity field, wherein the velocity field is determined based on preview frames that are generated from a low frequency domain of a subset of the frames of compressive sensed data.

9. A non-transitory computer readable medium comprising instructions that, when executed by a processor cause the processor to:

generate motion estimates using acquired frames of compressive sensed data, wherein the compressive sensed data is generated by sampling a signal associated with an object at rate below a Nyquist frequency of the signal; and generate dynamical video frame data using the motion estimates and the frames of compressive sensed data by solving an optimization problem, the optimization problem comprising a wavelet transformation term and a total variation regularization term subject to a compressible optical flow constraint, wherein the motion estimates are based on, at least in part, a velocity field, wherein the velocity field is determined based on preview frames that are generated from a low frequency domain of a subset of the frames of compressive sensed data.

10. The non-transitory computer readable medium of claim 9, further comprising instructions that, when executed by a processor cause the processor to:

generate preview frames from the frames of compressive sensed data using a multi-scale sensing matrix;

wherein the motion estimate is generated using the preview frames.

11. A non-transitory computer readable medium comprising instructions that, when executed by a processor cause the processor to:

generate motion estimates using acquired frames of compressive sensed data, wherein the compressive sensed data is generated by sampling a signal associated with an object at rate below a Nyquist frequency of the signal; and generate dynamical video frame data using the motion estimates and the frames of compressive sensed data by solving an optimization problem using an alternating direction augmented Lagrangian method, wherein the motion estimates are based on, at least in part, a velocity field, wherein the velocity field is determined based on preview frames that are generated from a low frequency domain of a subset of the frames of compressive sensed data.

* * * * *